United States Patent [19]
Trower, II et al.

[11] Patent Number: 5,983,190
[45] Date of Patent: Nov. 9, 1999

[54] CLIENT SERVER ANIMATION SYSTEM FOR MANAGING INTERACTIVE USER INTERFACE CHARACTERS

[75] Inventors: Tandy W. Trower, II, Woodinville; Mark Jeffrey Weinberg, Carnation; John Wickens Lamb Merrill, Redmond, all of Wash.

[73] Assignee: Microsoft Corporation, Redmond, Wash.

[21] Appl. No.: 08/858,648

[22] Filed: May 19, 1997

[51] Int. Cl.[6] ........................................................ G10L 7/08
[52] U.S. Cl. ............................................. 704/276; 704/275
[58] Field of Search ..................................... 704/220, 276, 704/275, 231, 251, 258, 270, 272, 200

[56] References Cited

U.S. PATENT DOCUMENTS

| | | | |
|---|---|---|---|
| 4,884,972 | 12/1989 | Gasper | 704/270 |
| 5,111,409 | 5/1992 | Gasper et al. | 395/807 |
| 5,278,943 | 1/1994 | Gasper et al. | 704/200 |
| 5,287,446 | 2/1994 | Williams et al. | 395/174 |
| 5,377,997 | 1/1995 | Wilden et al. | 434/323 |
| 5,425,139 | 6/1995 | Williams et al. | 395/175 |
| 5,430,835 | 7/1995 | Williams et al. | 395/806 |
| 5,613,056 | 3/1997 | Gasper et al. | 371/37.4 |
| 5,630,017 | 5/1997 | Gasper et al. | 704/276 |
| 5,668,997 | 9/1997 | Lynch-Fresner et al. | 395/683 |
| 5,715,416 | 2/1998 | Baker | 395/349 |
| 5,764,241 | 6/1998 | Elliott et al. | 345/473 |

OTHER PUBLICATIONS

Ken Getz, "Office 97 Shared Programmable Objects," 1997, MSDN Library, Apr. 1998 Version.

Microsoft Corp., "Microsoft Visual Basic for Applications, Version 5.0 Solutions Enhancements Guide," Oct. 1996, MSDN Library, Apr. 1998 Version.

Toggle Entertainment, Inc., "HTTP://togglethis.com," 1997, 1998, World Wide Web.

*Primary Examiner*—Richemond Dorvil
*Attorney, Agent, or Firm*—Klarquist Sparkman Campbell Leigh & Whinston, LLP

[57] ABSTRACT

A client server animation system provides services to enable clients to play animation and lip-synched speech output for an interactive user interface character. Through the programming interface of the server, clients can specify both speech and cursor device input that an instance of an interactive user interface character will respond to when the clients are active. Clients can also request playback of animation and lip-synched speech output through this interface. Services can be invoked from application programs as well as web scripts embedded in web pages downloaded from the Internet.

21 Claims, 8 Drawing Sheets

CLIENT SERVER ANIMATION SYSTEM FOR MANAGING INTERACTIVE USER INTERFACE CHARACTERS

TECHNICAL FIELD

The invention relates to user interface design in computers and more specifically relates to animated user interfaces.

BACKGROUND

One way to make the user interface of a computer more user friendly is to incorporate natural aspects of human dialog into the user interface design. User interfaces that attempt to simulate social interaction are referred to as social interfaces.

An example of this type of interface is the user interface of a program called Bob from Microsoft Corporation. Bob uses a social interface with animated characters that assist the user by providing helpful tips as the user navigates through the user interface. The Bob program exposes a number of user interface services to application programs including an actor service, a speech balloon service, a tracking service and a tip service.

The actor service plays animated characters in response to an animation request from an application. This service allows applications to play animated characters to get the user's attention and help the user navigate through the user interface. To make the character appear as if it is conversing with the user, the application can use the speech balloon service to display text messages in a graphical object that looks like a cartoon-like speech balloon. Applications can use the speech balloon service to display a special kind of text messages called a "tip" that gives the user information about how to operate the program. In the Bob user interface environment, the application program is responsible for monitoring for user input events that trigger tips. In response to detecting an event, the application passes it to the tracking service, which determines whether a tip should be displayed. One function of the tracking service is to avoid bothering the user by displaying too many tips. To prevent this, the tracking service counts the number of occurrences of an event and prevents the display of a tip after a given number of occurrences. The tracking service tells the tip service whether to initiate the display of a tip. When a tip is to be displayed, the tip service provides information about the tip to the application so that it can display an appropriate text message in a speech balloon.

While the Bob program does provide a number of helpful user interface features, it has a number of limitations. One of the significant limitations is that the animated characters must be displayed within the window of a single host application. Specifically, the animation must be displayed within the window of a host Bob application program where the background image of the window is known. This is a significant limitation because the animation is confined within the window of single application program Another important limitation of the animated characters in the Bob program is that they have no speech input or output capability. Speech input and output capability makes a user interface much more engaging to the user.

Speech synthesis and recognition software is commercially available. Microsoft Corporation has defined an application programming interface (API) called SAPI (Speech Application Programming Interface), and number of companies have created implementations of this interface. The purpose of SAPI is to provide speech services that application developers can incorporate into their programs by invoking functions in SAPI.

Despite the availability of speech services provided in SAPI compliant speech engines, there are a number of difficult design issues in developing interactive user interface characters that support speech input and output. One difficulty is determining how the interactive animation services will be exposed to application programs. In many applications with interactive animation, such as games for example, the application must provide and control its own user interface. This increases the complexity of the application program and prevents sharing of animation and input/output services among application programs.

A related difficulty with interactive animation is determining how to incorporate it into Internet applications. The content of a web page preferably should be small in size so that it is easy to download, it should be secure, and it should be portable. These design issues make it difficult to develop interactive animation for Web pages on the Internet.

SUMMARY OF THE INVENTION

The invention provides a client-server animation system used to display interactive, animated user interface characters with speech input and output capability. One aspect of the invention is an animation server that makes a number of animation and speech input and output services available to clients (e.g., application programs, Web page scripts, etc.). Another aspect of the invention is the way in which the clients can specify input commands including both speech and cursor device input for the character, and can request the server to play animation and speech output to animate the character. The animated output can combine both speech and animation such that the mouth of a user interface character is lip-synched to the speech output. The animation server exposes these services through an application programming interface accessible to applications written in conventional programming languages such as C and C++, and through a high level interface accessible through script languages. This high level interface enables programmers to embed interactive animation with speech input and output capability in Web pages.

One implementation of the animation system comprises an animation server, speech synthesis engine, and a speech recognition engine. The speech synthesis engine converts text to digital audio output in response to requests from the animation server. The speech recognition engine analyzes digitized audio input to identify words or phrases selected by the animation server.

The animation server exposes its animation and speech input/output services to clients through a programming interface. The server's interface includes methods such as Play(name of animation) or Speak(text string) that enable the clients to make request to animate a user interface character. The server constructs each frame of animation and controls the display of the animation in the user interface. To support lip- synched speech output, the server includes a mouth animation module that receives notification from the speech synthesis engine when it is about to output a phoneme. In response to this notification, it maps a frame of animation representing the character's mouth position to the phoneme that is about to be played back.

Clients specify the speech or cursor input that a character will respond to through a command method in the server's interface. The server monitors input from the operating system (cursor device input) and the speech recognition engine (speech input) for this input. When it detects input from the user that a client has requested notification of, it sends a notification to that client. This feature enables the client to tell the server how to animate the user interface character in response to specific types of input. The server enables multiple clients to control a single user interface character by allowing one client to be active at a time. The end user and clients can make themselves active.

The animation system outlined above has a number of advantages. It enables one or more clients to create an engaging user interface character that actually converses with the user and responds to specific input specified by the client. Clients do not have to have complex code to create animation and make an interactive interface character because the server exposes services in a high level interface. This is advantageous for web pages because a web page can include an interactive character simply by adding a reference to the agent server and high level script commands that specify input for the character and request playback of animation and lip-synched speech to animated the character.

Further features and advantages of the invention will become apparent from the following detailed description and accompanying drawings.

DETAILED DESCRIPTION

Computer Overview

Figure 1:
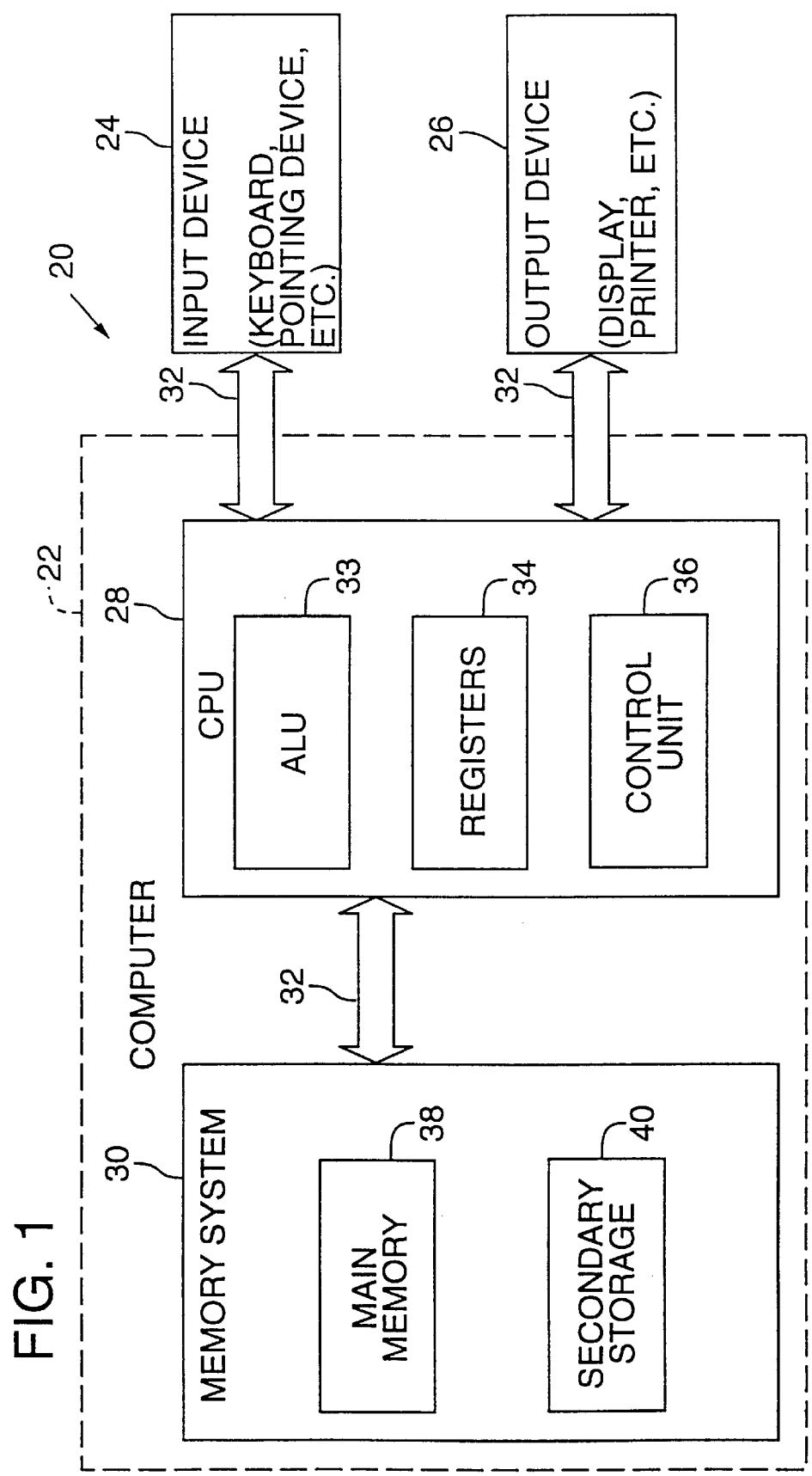
FIG. 1 is a general block diagram of a computer that serves as an operating environment for the invention.

FIG. 1 is a general block diagram of a computer system that serves as an operating environment for the invention. The computer system 20 includes as its basic elements a computer 22, one or more input devices 28, including a cursor control device, and one or more output devices 30, including a display monitor. The computer 22 has at least one high speed processing unit (CPU) 24 and a memory system 26. The input and output device, memory system and CPU are interconnected and communicate through at least one bus structure 32.

The CPU 24 has a conventional design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. The memory 26 can comprise a variety of alternative components having a variety of storage capacities.

The input and output devices 28, 30 are conventional peripheral devices coupled to or installed within the computer. The input device 28 can comprise a keyboard, a cursor control device such as a mouse or trackball, a physical transducer (e.g., a microphone), etc. The output device 30 shown in FIG. 1 generally represents a variety of conventional output devices typically provided with a computer system such as a display monitor, a printer, a transducer (e.g., a speaker), etc. Since the invention relates to computer generated animation and speech input and output services, the computer must have some form of display monitor for displaying this animation, a microphone and analog to digital converter circuitry for converting sound to digitized audio, and speakers and digital to audio converter circuitry for converting digitized audio output to analog sound waves.

For some devices, the input and output devices actually reside within a single peripheral. Examples of these devices include a network adapter card and a modem, which operate as input and output devices.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 34, registers 36 and control unit 38 or may be a single device in which one or more of these parts of the CPU are integrated together, such as in a microprocessor. Moreover, the number and arrangement of the elements of the computer system may be varied from what is shown and described in ways known in the computer industry.

Animation System Overview

Figure 2:
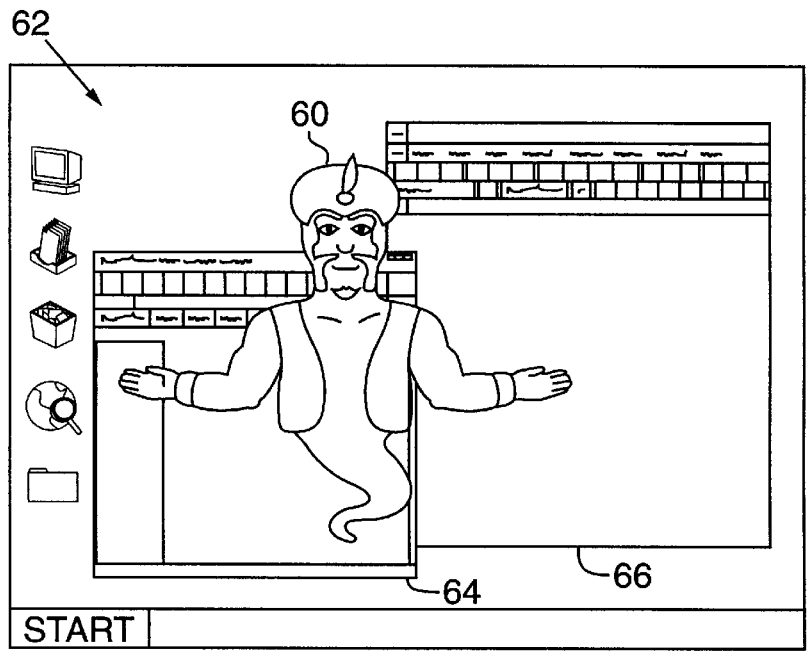
FIG. 2 is a screen shot illustrating an example of animated character located on top of the user interface in a windowing environment.

FIG. 2 is a screen shot illustrating an example of animated character located on top of the user interface in a windowing environment. This screen shot illustrates one example of how an implementation of the invention creates arbitrary shaped animation that is not confined to the window of a hosting application. The animated character 60 can move anywhere in the user interface. In this windowing environment, the user interface, referred to as the "desktop" includes the shell 62 of the operating system as well as a couple of windows 64, 66 associated with currently running application programs. Specifically, this example includes an Internet browser application running in one window 64 and a word processor application 66 running in a second window on the desktop of the Windows 795 Operating System.

The animated character moves on top of the desktop and each of the windows of the executing applications. As the character moves about the screen, the animation system computes the bounding region of the non-transparent portion of the animation and generates a new window with a shape to match this bounding region. This gives the appearance that the character is independent from the user interface and each of the other windows.

To generate an animation like this, the animation system performs the following steps:

1) loads the bitmap(s) for the current frame of animation;

2) constructs a frame of animation from these bitmaps (optional depending on whether the frame is already constructed at authoring time).

3) computes the bounding region of the constructed frame in real time;

4) sets a window region to the bounding region of the frame; and 5) draws the frame into the region window.

The bounding region defines the non-transparent portions of a frame of animation. A frame in an animation is represented as a rectangular area that encloses an arbitrary shaped animation. The pixels located within this rectangular area but do not form part of the arbitrary-shaped animation are transparent in the sense that they will not occlude or alter the color of the corresponding pixels in the background bitmap (such as the desktop in the Windows® Operating System) when combined with it. The pixels located in the arbitrary animation are non-transparent and are drawn to the display screen so that the animation is visible in the foreground.

The bounding region defines the area occupied by non-transparent pixels within the frame, whether they are a contiguous group of pixels or disjoint groups of contiguous pixels. For example, if the animation were in the shape of a red doughnut with a transparent center, the bounding region would define the red pixels of the doughnut as groups of contiguous pixels that comprise the doughnut, excluding the transparent center. If the animation comprised a football and goalposts, the bounding region would define the football as one or more groups of contiguous pixels and the goalposts as one or more groups of contiguous pixels. The bounding region is capable of defining non-rectangular shaped animation including one or more transparent holes and including more than one disjoint group of pixels.

Once computed, the bounding region can be used to set a region window, a non-rectangular window capable of clipping input and output to the non-transparent pixels defined by the bounding region. Region windows can be implemented as a module of the operating system or as a module outside of the operating system. Preferably, the software module implementing region windows should have access to input events from the keyboard and cursor positioning device and to the other programs using the display screen so that it can clip input and output to the bounding region for each frame. The Windows® Operating System supports the clipping of input and output to region windows as explained further below.

The method outlined above for drawing non-rectangular animation can be implemented in a variety of different types of computer systems. Below we describe an implementation of the invention in a client-server animation system. However the basic principles of the invention can be applied to different software architectures as well.

Figure 3:
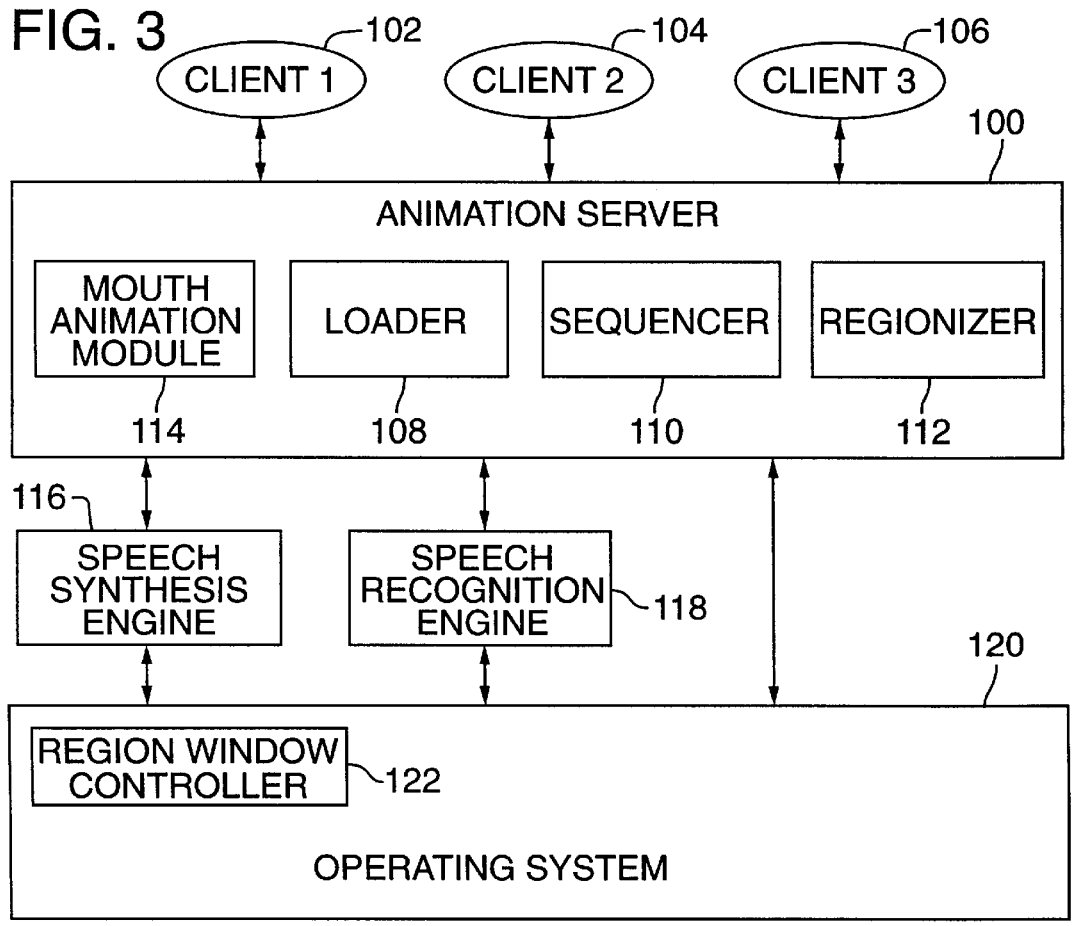
FIG. 3 is a diagram illustrating the architecture of an animation system in one implementation of the invention.

FIG. 3 is a general block diagram illustrating the architecture of a client server animation system. The animation system includes an animation server 100, which controls the playback of animation, and one or more clients 102–106, which request animation services from the server. During playback of the animation, the server relies on graphic support software in the underlying operating system 120 to create windows, post messages for windows, and paint windows.

In this specific implementation, the operating system creates and clips input to non-rectangular windows ("region windows"). To show this in FIG. 3, part of the operating system is labeled, "region window controller" (see item 122). This is the part of the operating system that manages region windows. The region window controller 122 creates a region window having a boundary matching the boundary of the current frame of animation. When the system wants to update the shape of a region window, the regionizer specifies the bounding region of the current frame to the operating system. The operating system monitors input and notifies the server of input events relating to the animation.

The services related to the playback of animation are implemented in four modules 1) the sequencer 108; 2) the loader 110 3) the regionizer 112; and 4) the mouth animation module 114. The sequencer module 108 is responsible for determining which bitmap to display at any given time along with its position relative to some fixed point on the display.

The loader module 110 is responsible for reading the frame's bitmap from some input source (either a computer disk file or a computer network via a modem or network adapter) into memory. In cases where the bitmap is compressed, the loader module is also responsible for decompressing the bitmap into its native format. There are variety of known still image compression formats, and the decompression method, therefore, depends on the format of the compressed bitmap.

The regionizer module 112 is responsible for generating the bounding region of the frame, setting it as the clipping region of the frame's hosting region window and then drawing the frame into the region. In slower computers, it is not feasible to generate the bounding region as frames are constructed and played back. Therefore, in this implementation the regionizer also supports the loading of bounding region information in cases where it is precomputed and stored along with the frame data in the animation file.

The mouth animation module 114 is responsible for coordinating speech output with the animation representing a user interface character's mouth. The mouth animation module receives a message from a speech synthesis engine 116 whenever a specific phoneme is about to be spoken. When the mouth animation module receives this message, it performs a mapping of the specified phoneme to image data stored in a animation mouth data file that corresponds to the phoneme. It is responsible for loading, decompressing, and controlling the playback of the animation representing the character's mouth.

The speech synthesis engine 116 is responsible for generating speech output from text. In this implementation, the speech synthesis engine 116 is a SAPI compliant text to speech generator from Centigram Communications Corp., San Jose, Calif. Other SAPI compliant text to speech generators can be used as well. For example, Lernout and Hauspie of Belgium also makes a SAPI compliant text to speech generator.

The speech recognition engine 118 is responsible for analyzing digitized audio input to identify significant words or phrases selected by the animation server. The animation server defines these words or phrases by defining a grammar of acceptable phrases. The client specifies this grammar by specifying sequences of words that it wants the system to detect in a text string format. The server also supports a command language that includes boolean operators and allows alternative words. This command language enables the client to specify a word or phrase along with a number of possible alternative or option words to look for in the speech input. The syntax of the command language is described in more detail below.

The speech recognition used in this implementation is a SAPI compliant speech recognition engine made by Microsoft Corporation. A suitable alternative speech recognition engine is available from Lernout and Hauspie of Belgium.

The operating system in this implementation is the Windows® 95 operating system from Microsoft Corporation. The application programming interface for the operating system includes two functions used to create and control region windows. These functions are:
1) SetWindowRgn; and
2) GetWindowRgn SetWindowRgn The SetWindowRgn function sets the window region of a rectangular host window. The window region is an arbitrary shaped region on the display screen defined by an array of rectangles. These rectangles describe the rectangular regions of pixels in the host window that the window region covers.

The window region determines the area within the host window where the operating system permits drawing. The operating system does not display any portion of a window that lies outside of the window region.

```
int SetWindowRgn(
    HWND hWnd,        // handle to window whose window region
                      is to be set
    HRGN hRgn,        // handle to region
    BOOL bRedraw      // window redraw flag
    );
```

Parameters
hWnd
Handle to the window whose window region is to be set.
hRgn
Handle to a region. The function sets the window region of the window to this region. If hRgn is NULL, the function sets the window region to NULL.
bRedraw
Boolean value that specifies whether the operating system redraws the window after setting the window region. If bRedraw is TRUE, the operating system does so; otherwise, it does not.
Typically, the program using region windows will set bRedraw to TRUE if the window is visible.
Return Values
If the function succeeds, the return value is nonzero.
If the function fails, the return value is zero.
Remarks
If the bRedraw parameter is TRUE, the system sends the WM_WINDOWPOSCHANGING and WM_WINDOWPOSCHANGED messages to the window.
The coordinates of a window's window region are relative to the upper-left corner of the window, not the client area of the window. After a successful call to SetWindowRgn, the operating system owns the region specified by the region handle hRgn. The operating system does not make a copy of the region. Thus, the program using region windows should not make any further function calls with this region handle. In particular, it should not close this region handle.

GetWindowRgn

The GetWindowRgn function obtains a copy of the window region of a window. The window region of a window is set by calling the SetWindowRgn function.

```
int GetWindowRgn(
    HWND hWnd,    // handle to window whose window region is
                  to be obtained
    HRGN hRgn     // handle to region that receives a copy of
                  the window
region
    );
```

Parameters
hWnd
Handle to the window whose window region is to be obtained.
hrgn
Handle to a region. This region receives a copy of the window region.
Return Values
The return value specifies the type of the region that the function obtains. It can be one of the following values:

| Value | Meaning |
| --- | --- |
| NULLREGION | The region is empty. |
| SIMPLEREGION | The region is a single rectangle. |
| COMPLEXREGION | The region is more than one rectangle. |
| ERROR | An error occurred; the region is unaffected. |

Comments
The coordinates of a window's window region are relative to the upper-left corner of the window, not the client area of the window.

The region window controller shown in FIG. 3 corresponds to the software in the operating system that supports the creation of region windows and the handling of messages that correspond to region windows.

In this implementation, the speech recognition engine and the speech synthesis engine communicate with an audio input and output device such as a sound card according to the SAPI specification from Microsoft. In compliance with SAPI, these engines interact with an audio device through software representations of the audio device referred to as multimedia audio objects, audio sources (which provide input to the speech recognition engine) and audio destinations (which mediate output from the speech synthesis engine). The structure and operation of this software representation are described in detail in the SAPI specification available from Microsoft.

In the next two sections, we describe two alternative implementations of the animation system shown in FIG. 3. Both implementations generate arbitrary shaped animation and can compute the arbitrary shaped region occupied by non-transparent pixels of a frame in real time. However, the manner in which each system computes and stores this region data varies. Specifically, since it is not computationally efficient to re-compute the region data for every frame, these systems use varying methods for caching region data. The advantages of each approach are summarized following the description of the second implementation.

First Implementation of the Animation System

Figure 4:
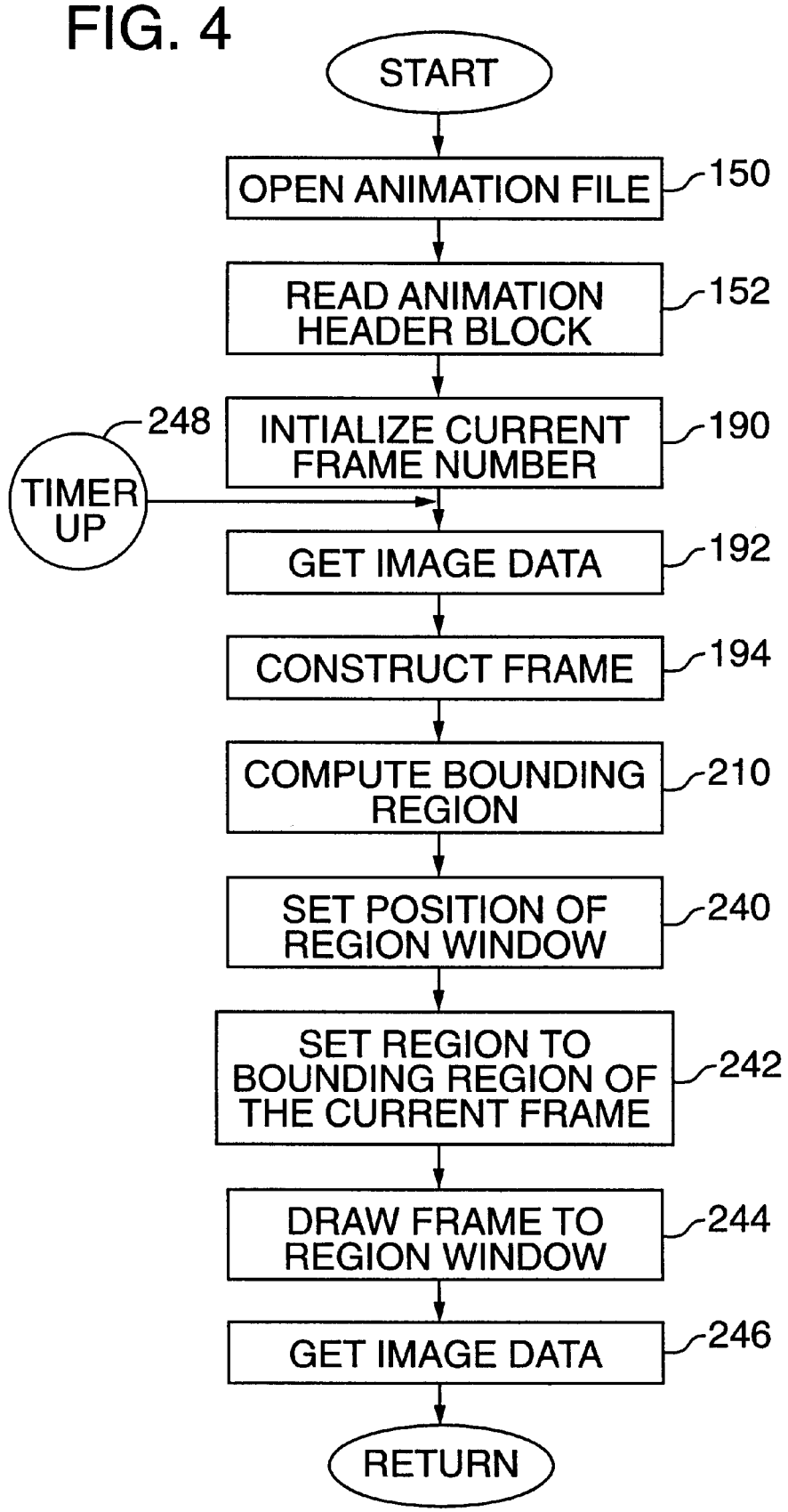
FIG. 4 is flow diagram illustrating how the animation server in FIG. 3 plays an animation.

FIG. 4 is flow diagram illustrating how the animation server plays an animation. First, the animation data file is opened via the computer's operating system as shown in step 150. The animation data file includes an animation header block and a series of bitmaps that make up each of the frames in the animation. Once operating system has opened the file, the loader module 108 reads the animation header block to get all of data needed to play an animation and passes it to the sequencer as shown in step 152.

Figure 5:
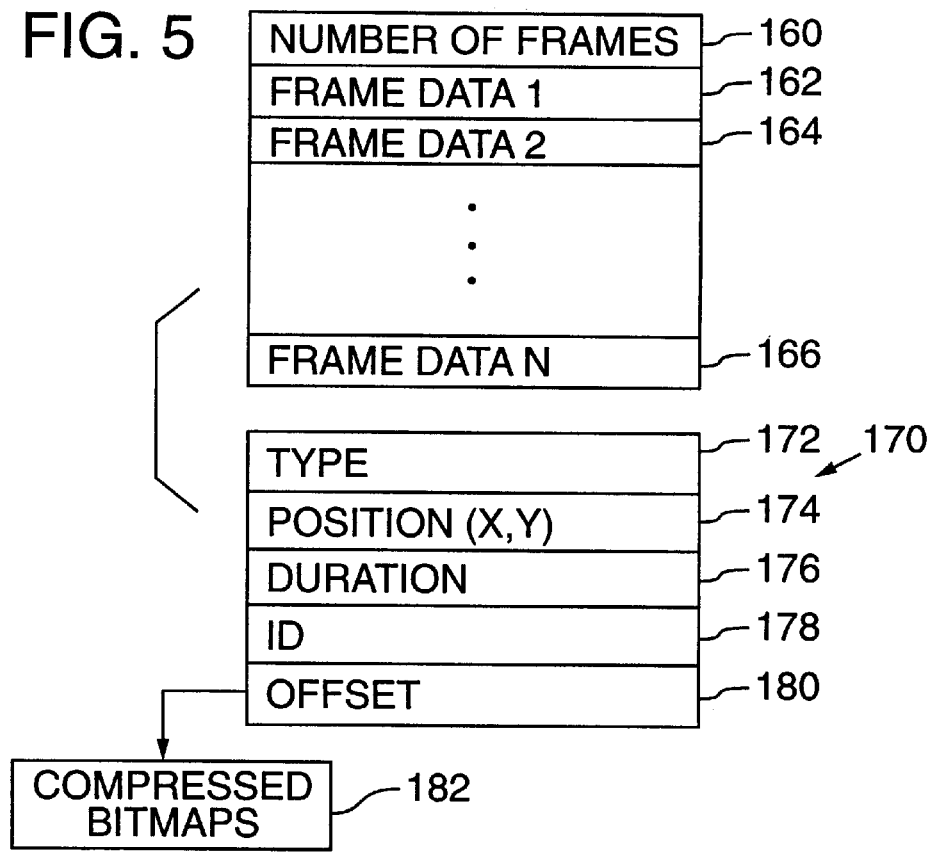
FIG. 5 illustrates an example of the animation file structure.

FIG. 5 illustrates an example of the animation file structure. The animation header lists the number of frames (160) and includes a block of data for each frame (see items 162-166 in FIG. 5 for example). The frame data 170 consists of a frame type (image, branch or sound) 172, frame position (x, y coordinates) 174, duration (in 60ths or a second) 176, a unique ID 178, and an offset 180 into the animation data file where the compressed bitmaps 182 for the frame reside. Animation branch frames allow developers to specify alternate pathways through the animation sequence other than the default sequential flow. Sound frames allow developers to specify digitized sound data to be played at a specific time in the animation sequence.

Back at FIG. 4, the process for playing animation continues at step 190, where the sequencer initializes the current frame number. Once the loader has successfully loaded the animation header block, the sequencer can start playing the animation. It initializes the current frame number to zero and looks at the type field of the current block of frame data to determine the type for the current frame.

The next step 192 is to get the frame data for the current frame as shown in step 192. When necessary, the loader loads the data for the current frame from the animation file as specified in the frame data block. The sequencer then constructs the frame from the data retrieved for the current frame as shown in step 194.

Figure 6:
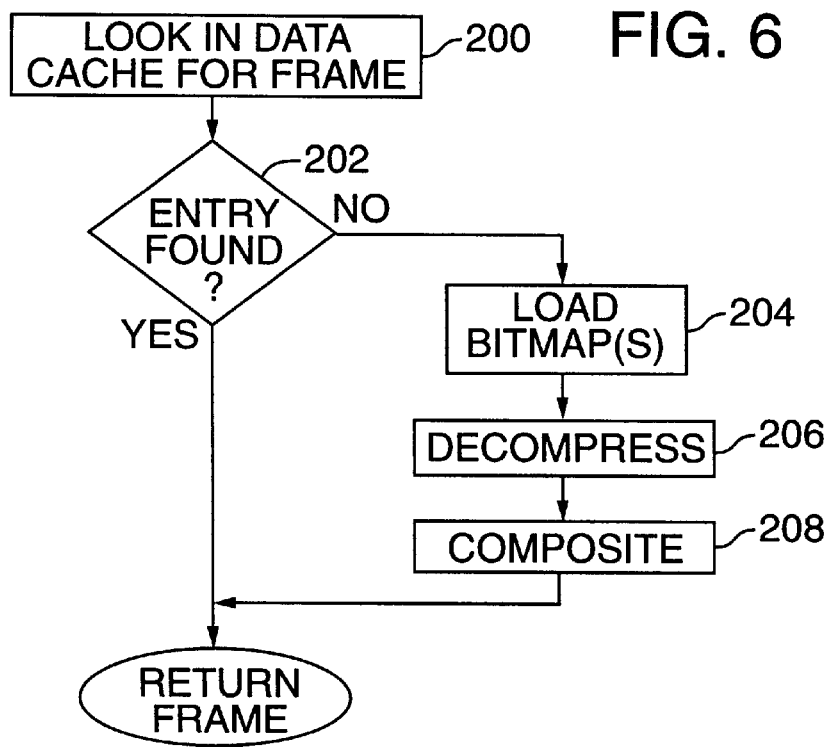
FIG. 6 is a flow diagram illustrating a method used to retrieve image data to construct a current frame of animation.

FIG. 6 is a flow diagram illustrating the method used to retrieve image data for the current frame. If the frame type is an image, the sequencer first looks in a data cache of frame bitmaps for an entry equal to the next frame's ID as shown in steps 200 and 202. The image data cache is a section of the computer's main memory where a fixed number of decompressed frame bitmaps reside in a most-recently-used queue (MRU). Data caching uncompressed frame bitmaps significantly improves overall performance of the animation system.

If sequencer finds the frame ID in the data cache, it returns with the constructed frame that is already in the cache as shown in the flow diagram. If there is no entry in the data cache for the current frame, the sequencer passes a request on to the loader to load the required bitmaps for the specified frame. Each animation frame can be made up of multiple layered bitmaps. The loader uses the data offset for the frame from the animation header block to read all of the compressed bitmaps that make up the frame from the animation data file into the computer's memory (see step 204, FIG. 6).

Once in memory, the loader decompresses the individual bitmaps and combines them into a single decompressed bitmap as shown in steps 206 and 208. The loader constructs a composite bitmap by performing bit block transfers from the decompressed bitmaps to an off-screen buffer, which holds a composite bitmap. This composite bitmap is first saved in the data cache and then passed back to the sequencer where it can be used in generating the current frame. If the sequencer had initially found an entry in the data cache for the specified frame ID, it could have retrieved the composited, decompressed bitmap for the frame from the data cache. This step eliminates the need to decompress and composite the animation frame when it has already been done recently.

Once the sequencer has generated the appropriate decompressed bitmap for the current frame, it can pass control to the regionizer, which computes a bounding region for the frame if the bounding region is not already available. The bounding region defines the non-transparent portion of the constructed frame. For a solid object like the genie in FIG. 2, the bounding region is the boundary of the genie. Some objects can have transparent regions inside of them, in which case the bounding region defines the non-transparent portion and also describes any transparent portion within an object as well. A constructed frame of animation can have a number of disparate pieces which are not necessarily contiguous. The step of computing the bounding region (210, in FIG. 4) can be computed in real time, which means that the bounding region does not need to be pre-computed. Instead, the regionizer can compute the bounding region as it constructs and displays each frame.

Figure 7:
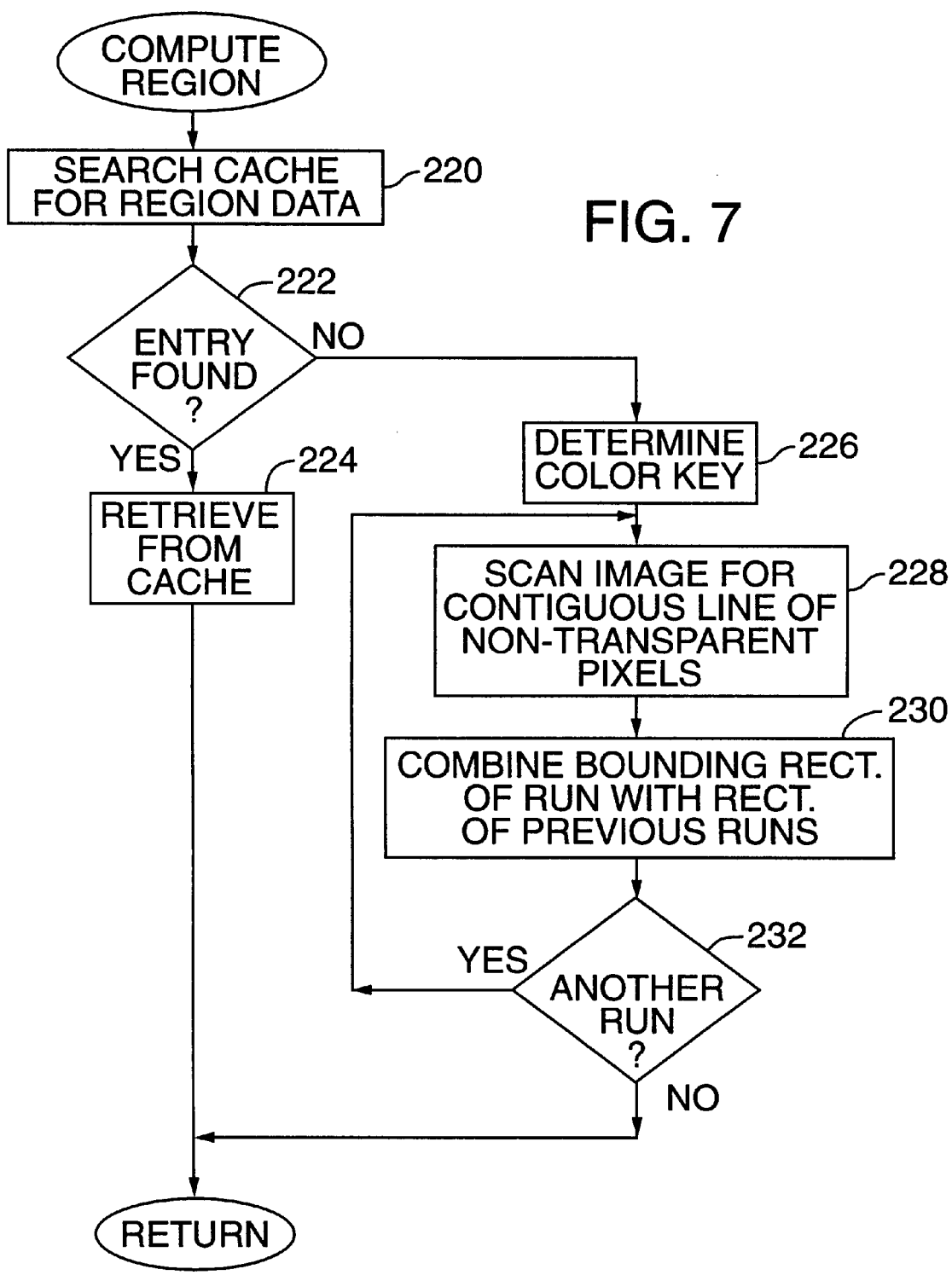
FIG. 7 is a flow diagram illustrating the process for obtaining the bounding region of an arbitrary shaped animation.

In this implementation, the regionizer takes one of three actions: 1) look in a region data cache to see if the region data is already present;2) on faster computers, generate the bounding region in real time; and 3) on slower computers, load and use a pre-computed bounding region. FIG. 7 is a flow diagram illustrating the process for obtaining the bounding region.

The first choice for the regionizer is to attempt to retrieve the necessary region data from a region data cache in main memory of the computer as shown in step 220 of FIG. 7. This cache works similarly to the image cache in that it is a most recently used queue (in other words, it is a last-used-first-out queue). If the necessary data is found in the data cache it is retrieved (see steps 222, 224).

If it is not in the queue, two alternate pathways are possible. FIG. 7 illustrates the steps performed on a fast computer where the regionizer computes the bounding region in real time. The animation server is able to determine whether to compute the bounding region in real time by checking the computer's registry If the computer executing the animation server is deemed fast enough, the regionizer will compute the bounding region of the decompressed bitmap frame in real-time. In this implementation, the regionizer computes the bounding region as shown in FIG. 7 and described below. First in step labeled 226, the regionizer determines which color (the color key) the bitmap is using to identify its transparent portions. The first pixel in the frame's bitmap (i.e. the pixel at location (0,0) in rectangular coordinate space of the bitmap where (0,0 is the upper left hand corner) is deemed special in that it defines the transparent color of the frame. The pixel value of this transparent color is sometimes referred to as the color key. Using this color key, the regionizer scans the bitmap one line at a time looking for contiguous runs of non-transparent color as shown in step 228. When it finds a run of non-transparent pixels it combines the bounding rectangle of the run with rectangles from previous runs 230. These rectangles always have a height of one, i.e. they are a single scan line of the bitmap, and have a width less than or equal to the total width of the bitmap. The operating system is responsible for combining the rectangles into non-rectangular regions in an optimized way. This process continues for every line in the bitmap until the entire bitmap has been completely scanned (as reflected generally by the loop back to step 228 from decision block 232). Upon completion, a single region is available that describes the bounding region of the animation frame.

On computer systems that are too slow to perform this type of processing in the time required by the animation server, the region data can be pre-processed during the animation development. The same process described above is used to generate the region data for each bitmap frame in the animation. The region data is then compressed and stored to a separate data file along with the animation data file. On slow systems, instead of generating the region data when it is needed, the data is simply read from a data file and decompressed. This method is far less CPU intensive than generating the region data in real-time which is important in low end PC systems. The disadvantage of this technique is that the region data for an animation can be quite large when stored to a data file, cannot be scaled (which is discussed further below), and is far less flexible in that it must be computed at the same time the animation is built. When the system is enhanced to support real-time rendered animations, this technique does not work because the bounding region needs to be generated in real time after the image has been modified, i.e. scaled, rotated, translated etc.

After the regionizer has retrieved the bounding region, either by generating it in real-time or by loading and decompressing it from a data file, it saves it in the region data cache for future use.

We now return again to the diagram in FIG. 4. At this point, the animation server has all of the components in memory that are necessary to display the next frame of the animation. The first step is to position the region window at the appropriate location as specified by the frame's x, y coordinate in the frame data block (see step 240 in FIG. 4). Calls to the operating system, such as SetWindowPos in the Windows® Operating System, make this step possible.

The next step 242 is to set the animation frame window's region to the region generated by the regionizer. The operating system is responsible for sending the appropriate paint messages to any window that intersects with the previous region of the animation frame window so that this area can be redrawn. In response to receiving these messages, the application owning the window is responsible for repainting itself in the portion of its window altered by the animation.

One way to re-draw the portion of the desktop that is modified by the animation as it moves from frame to frame is to compute a bounding rectangle that encloses the animation in two consecutive frames and to re-compute the portion of the user interface that falls within this bounding rectangle. This bounding rectangle captures the animation in its current and previous frame. In other words, it includes the screen area once occupied by the animation in the previous frame as well as the screen area occupied by the animation in the current frame. The operating system instructs applications within this rectangle to redraw themselves. The portion of the desktop user interface within this rectangle is copied to an off-screen buffer. The animation server then instructs the operating system to draw the current frame of animation, clipped by its bounding region, to this off-screen buffer. Finally, the operating system performs a bit block transfer of this portion to the frame buffer to display the current frame of animation along with the re-drawn portion of the Windows desktop user interface, which is the background of the animation.

As shown in step 244 of FIG. 4, the animation server draws the decompressed, composited bitmap generated by the sequencer to the animation frame's region window. The operating system clips this bitmap to the bounding region of the window (which exactly matches the non-transparent pixels of the composited bitmap). The sequencer then sets an operating system timer to go off after an amount of time equal to the duration specified in the frame data (see step 246).

When the timer goes off, the entire process is repeated for the next frame in the animation. This is illustrated in FIG. 4 by the timer-up message 248.

The animation server employs a similar technique to animate a portion of an animated character representing the character's mouth. The animation server loads, decompresses, and caches bitmaps representing the character's mouth. To create the illusion of speech, the animation server draws a bitmap representing the mouth on top of the constructed frame representing the character at the (x, y) coordinates where the character's mouth is located.

In this implementation, the servers maintains bitmaps representing the character's mouth in a variety of different positions in a mouth animation file. There are a number of different bitmaps, each representing the position of the mouth for a corresponding phoneme. To enhance realism, the server can maintain different sets of mouth data files and select the appropriate one based on the position of the character. Each set of mouth data files can map a set of phonemes to bitmaps representing the mouth position for a phoneme.

To lip-synch the mouth animation with the speech output, the server instructs the speech synthesis engine to notify it before it generates speech output for a phoneme. Just before the speech synthesis engine is about to output a phoneme, it passes a message to the mouth animation module identifying the phoneme. The mouth animation module loads the animation and draws at the (x,y) location on top of the current frame of animation.

If the region data is being generated in real-time, animations can be scaled and played back at a size different from the size that the animation was originally developed at. The entire process as described above is essentially the same. The main difference is that the sequencer can scale the composited, decompressed bitmap returned by the loader using the specified scaling factor. The regionizer works on decompressed bitmaps stored in memory and needs no knowledge of the size of the original source of the bitmap or any scaling factor. The operating system can be used to perform scaling of bitmaps in an efficient manner. Once the bitmap is scaled it can be passed to the regionizer and the system works as described above. Allowing scaling of animations in real-time is important because it allows end users to have greater control over the look and feel of the system.

Another significant feature of this implementation is the way in which the animation's moving, non-rectangular window receives cursor device input from the user. Since the animation server repetitively updates the bounding region of the animation for each frame, the active area of the animation always corresponds to the non-transparent portion of the current frame. Thus, the operating system only notifies the server of cursor input (e.g. right and left mouse clicks) when the cursor is positioned within the non-transparent portion of the current frame. This form of interactive behavior enhances the effect of the animation operating outside the focus of any rectangular windows currently displayed on the Windows desktop user interface.

Second Implementation of the Animation System

The second implementation of the animation system is similar to the first animation system in that it generates arbitrary shaped animation and can also generate a bounding region for a frame of animation in real time. From the stand-point of the user, this implementation generates arbitrary-shaped animation with similar behavior as the first implementation. Namely, it produces arbitrary shaped animation and plays a sequence of animation in the foreground of the user interface such that the animation is not limited to a window of a host application or to a window of an application that requests playback of the animation. However, it has some differences: 1) the system does not load individual bitmaps and then construct each frame from separate bitmaps, but instead, loads constructed frames; 2) it does not cache region data in a MRU cache in main memory as above, but instead, caches all regions in secondary storage (e.g., on a computer's hard disk) as they are generated; and 3) it has the additional capability to pre-compute region data on a low priority thread.

Below we describe these and other implementation details. We describe this system using the example of an animated "character," an animation that has life-like gestures. One example of this type of character is the genie shown in FIG. 2. Although it is described using the specific example of an animated character, this animation system can be applied to other forms of arbitrary shaped animation as well.

The system first gets a request to open a character file. The file contains character, animation and audio data and is a structured storage file (see "Inside OLE" by Kraig Brockschmidt for a description) which contains all of the data necessary to play region window animations. At this time, the calling module can register itself to receive event notifications that describe the current state of the animation system at various times. Once the file is successfully opened, the character data stream is read into memory and the character is initialized. The data included in the character data stream includes the character's color table, an index into the color table that defines the transparent color (or color key), size information (i.e. width and height of the character frame), audio definition data, animation version information and any other data necessary for initialization of the character. A window is then created of the appropriate size but is not made visible until explicitly done so by the calling module (such as a client program to the animation server). A logical palette is created from color table information retrieved from the character data stream. The character is now initialized and is ready for animation requests.

Each animation is stored in a separate data stream in the structured storage file. When an animation is requested to be played, the system finds the appropriate data stream and begins loading it into memory. Animation data consists of a sequence of animation frame data. Frame data consists of all of the data necessary to render an animation frame to the display device. This consists of the actual image bits for the frame, as well as a duration, coordinate offsets, frame branching logic, and lip-synched mouth image data (described further below). If the image bits are in a compressed format they are decompressed. Note that in this implementation, the frame is already constructed in the sense that it does not have to be assembled by combining more than one bitmap. As demonstrated in the first implementation, it is possible to construct frames in real time as opposed to using pre-constructed frames.

After the animation data has been successfully loaded and decompressed, the animation can be played. The animation is played by first rendering the uncompressed frame image data for the next frame to an offscreen video memory buffer. The animation system then creates a window region from the buffer that defines all areas of the image that are non-transparent. The algorithm for creating the region is as follows:

```
ImageRegion = empty
for each scan line in the image
    for each run of non-transparent pixels in the scan line
        create a rectangular region of height one
        combine the region with ImageRegion
    endloop
```

It is important to note that the above method also works for images that contain either "holes" or more than one disjoint region. A "hole" is a transparent region completely surrounded by a non-transparent region. A disjoint region is any non-transparent region completely surrounded by either transparent pixels or the boundaries of the image. "Holes" can contain any number of disjoint regions within themselves. The image region is defined to be the list of non-transparent regions. The image region is analogous to the "bounding region" described in the first implementation and the terms can be used interchangeably. In both cases, the region defines the location of non-rectangular, non-transparent image portions whether or not they comprise a contiguous group of pixels or disjoint groups of contiguous pixels.

Once the image region is generated, the operating system is called to assign the region to the window. The operating system is responsible for clipping all input and output to the region associated with a window. After the region has been set, the image data can be copied from the offscreen memory buffer to the display device, using the operating system's bit block transfer, where it will be clipped to the bounding region assigned to the window. The Windows Operating System, for example, has an application programming interfaces (APIs) that support bit block transfers to offscreen buffers. Input and output are clipped to the list of (possibly) disjoint regions that make up the image region.

After the frame image is rendered to the display device, an operating system timer is set to go off in the amount of time specified by the frame's duration. When the timer goes off, the animation system must determine the next frame to render. If the frame contains no branching logic, the system determines if it is the last frame in the animation and notifies the calling module of the completion (if the module registered itself to receive event notifications). If it is not the last frame, the next frame is either the next frame in sequential order, or the frame specified in the branching logic for the current frame.

Branching logic is defined by specifying a frame number to branch to and a percentage of time that the branch should be taken. Multiple branches can be defined as long as the total percentage does not exceed 100%. The first branch is given a branch probability between 1 and it's percentage. Subsequent branches are given a probability between the maximum probability of the previous branch plus one to that value plus their percentage. To determine which branch to take, the animation system generates a random number between 1 and 100 and starts searching sequentially through the frame branches until it finds a branch whose maximum probability is less than or equal to the random number. If no branch can be found, the next sequential frame is selected.

Once the next frame number is known, the system can repeat the process of rendering, region generation, and displaying of the frame image data. The repetition of this process is an animation.

The generation of the region data for an animation frame in real-time is "expensive" in terms of CPU cycles. Thus a system of region caching has been implemented. It would be beneficial if the region data could be processed at character development time and saved along with the character animation data. This is possible but has serious limitations. If the region data is pre-processed, the character can not be scaled at run-time. The character data file also has to store all of the region data for every frame in every animation. The data can be quite large. This is not a problem when the entire character data file resides on the local machine running the animation system. However, the animation supports incremental downloading of animation data over low bandwidth communication lines such as the Internet. Downloading the region data for a character would be extremely slow. Thus a hybrid approach to region generation is used in this alternative implementation. The approach minimizes the download time associated with a character data file and minimizes the CPU cycles needed to generate regions in real-time.

When a region for an animation frame needs to be rendered, the system will first look in a local storage cache of regions for a match. In contrast to the fixed sized MRU cache in the first implementation, this cache is located in secondary storage, i.e. the hard disk. If the region is found it can be loaded from disk very fast and assigned to window as described above. If the region is not found, it is generated in real-time and used as described above. However, after the region is used it is saved to the region cache on disk. The next time the region is required it can simply be read from the cache instead of being generated in real-time. Thus, the system gets the benefit of the pre-computed region without it having to have been downloaded over a possibly low bandwidth communications link. This gives the system the appearance of improved performance over time, i.e. the more frames that are displayed (which results in region generation and thus caching), the better the performance.

The system can also pre-generate regions on a low priority background thread when the animation system is idle. When the character is loaded, the region generation thread is started in a suspended mode. Whenever the system is idle, it resumes the thread (in low priority) which starts generating regions for any animation frame that does not already have an entry in the cache. The thread runs at a very low priority so that it does not unnecessarily steal CPU cycles from other applications currently running. The thread is suspended when the animation system becomes active. Over time, every animation frame in the character data file will have a pre-computed region in the cache. Once this is accomplished the region generation thread can be terminated.

On low-end systems that are simply not capable of ever generating regions in real-time, the computation of regions must be done before the system can be used. This can be done at character installation time when the user commonly expects a delay.

Regions are directly linked to frame images at a given scale. The default scale of an animation frame is 100%, i.e. the frame should be displayed at its actual size. The animation system supports scaling of animations. This has the advantage that animations can be played at a size that is relative to the resolution of the display being used. This is necessary to overcome the problem that an animation created at a certain size looks bigger or smaller depending on both the resolution and physical size of the display device.

Caching region does improve performance by reducing the need to re-compute region data. However, if the user or a client application wishes to scale an animation (enlarge or reduce its screen size), cached region data cannot be used because it is the wrong size. Therefore, when the scale of an animation changes, all pre-computed regions are deemed unusable and must be recomputed. Thus, the entire region cache must be flushed and regenerated. The region generation thread must be restarted or reset (if it is still running). This process is quite expensive but is acceptable because scaling is something that users will typically do infrequently.

The animation system supports the incremental downloading of animations from a remote site. This is extremely beneficial for running the system over low bandwidth communication links. When a character is loaded from a remote site, only the character data stream is initially downloaded. The character data stream contains all of the data necessary to initialize the character. If a character data stream already exists on the local machine, the downloaded data is compared to the local data to determine if any animations currently stored locally have been superseded by a newer version on the remote site. If so, those animations are marked so that if a request for the animation is made the system knows that it must retrieve the newer version from the remote site. No animation data is downloaded. The character data stream is typically very small so the system can be initialized quite quickly. When a request for an animation is made, the system looks in the character data file on the local storage device. If the animation is found, it is loaded and played as described above. If the animation is not found it is downloaded from the remote site. Once the download is complete, the animation can be played as described above.

It is desirable for calling modules (e.g., clients) to have control over when animations get downloaded. For instance, the calling module may want to download several animations that are played in sequence. If none of the animations reside locally, the system would download the first animation, play the animation, download the next animation, play it, etc. This is obviously not the desired effect. Thus, the animation system allows callers to download sets of animation. When a calling module requests an animation to be downloaded, the system first checks to see whether or not the animations reside locally. If it does, the system simply returns. If it does not the system begins the process of downloading the animations from the remote site. It can do this in a asynchronous fashion. The system also supports a notification API so that calling modules can download animations asynchronously and then be notified when they have been downloaded. Thus in the example above the calling module could do the following:

```
Request = Get "Animation 1", Get "Animation 2",
Get "Animation 3"
    On Request Complete
    Play "Animation 1"
    Play "Animation 2"
    Play "Animatiom 3"
```

This results in a request for the three animations to be downloaded at the same time. The "Request Complete" event indicates that all of the animations reside locally can be played one after another without any delays. Animations do not have to be explicitly downloaded. If an animation is requested that is not stored locally, the system adds an implicit download call. The above scheme also works for audio data files that may be associated with an animation.

Asynchronous download calls are always temporarily interrupted by synchronous calls. Thus, if the calling module asynchronously downloads an animation and a synchronous animation request is generated as a result of end user interaction, the synchronous requests gets priority. This follows the notion that the end user really is in control of setting the priority for animation downloads.

As demonstrated by the alternative implementations described here, there are a number of different ways to implement the animation system, and therefore, it is not limited to these specific implementations. The cache for region data in the first implementation is a better design in cases where the same animations are used repeatedly in a short period of time because the MRU cache is more fully utilized, and it is quicker to read region data from main memory rather than retrieve it from secondary storage. However, it is often more likely that clients will make requests for different animations, rather than make repeated requests to play a small number of animations over and over. In these cases, the second implementation has better performance because all region data is cached in secondary storage as it is computed, rather than being limited to a fixed size MRU cache. Since region data is computed in real time along with an animation request and is also pre-computed before a request using a background thread, the second implementation will approach a cache hit rate of 100% over time. Depending on the desired performance and the nature of the animation requests, an animation system can be implemented using different combinations of the features described above to optimize performance.

It is important to point out that there are other possible implementations of an animation system. For example, one can abstract the general method described in the previous sections with a client/server architecture. In this abstract form, the processes used to draw animations on the screen are divided into two separate classes of operation. The file I/O, the cache, and all other data used for generating the character animations are accessed through an OLE COM server called an "animation data provider." The regionizer and the sequencer reside in a client. (This client can, in turn, provide services to other programs on the computer.) This abstract representation allows the animation system to use bitmaps that are represented in arbitrary formats on secondary storage. It also allows the animation system to provide smooth transitions from one posture to another for arbitrary animated characters. This frees the system from any fixed character file format, as well as reducing the dependence of the animation system on the Windows® operating system.

In one implementation of this client/server architecture, the animation system calls into the animation data provider through certain COM interfaces. Significantly, this implementation of the client/server architecture does not depend on any particular file format. It only depends upon the animation data provider's ability to construct bitmap representations of the current frame of the animation of the character, and to pass those on to the server at a relatively high speed. These COM interfaces allow the animation system to obtain information about the character in general, as well as information about the specific poses of the character. Thus, they provide access to all of the character's properties, including its name, its size, the number of bit planes in each animation bitmap, as well as to the animation bitmaps themselves. In addition, these COM interfaces allow the animation system to pass provider-defined state information to different animation data providers. This state information can be encoded in a form that only those data providers understand, providing a degree of protection for the content of the character. Finally, these COM interfaces are optimized to reduce the costs of accessing this data. This optimization is necessary in order to handle the case of an application client with a dedicated animation data provider. It has two parts. First, animation data providers can support standard OLE COM interfaces through which their persistent state can be captured so that each instance of an animation data provider can be reconstituted inside the server process. In addition, the COM interfaces used specifically to provide animation data are optimized to store and pass that data in a format particularly well-suited to transfer across process boundaries.

Animation Server COM Object Implementation

The animation services described above are implemented as a Component Object Model (COM) based OLE Automation Servers. For a detailed discussion of OLE see Inside OLE, Second Edition by Kraig Brockschmidt, Microsoft Press, Redmond, Wash. 1995. The COM server implements a set of animation services that can be used by an unlimited number of clients, which are typically application programs. These clients can connect to the server using either a C/C++ COM Application Programming Interface (API) or via a Microsoft ActiveX Control interface. The ActiveX control allows access to all of the functionality of the COM server while providing an interface that is easy to use and abstracts the COM server's interface to a higher level.

COM Object Overview

In object oriented programming terminology, an "object" is an instance of a programmer-defined type referred to as a class, which exhibits the characteristics of data encapsulation, polymorphism and inheritance. A class is the definition of a data structure and the functions that manipulate that structure (member functions).

Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. Programs that wish to use an object do not access the object's data directly, but must instead call functions on the object's interfaces to operate on the data. An interface is explained further below, but in general, is a group of related functions that a program can invoke to access an object's data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

Figure 8:
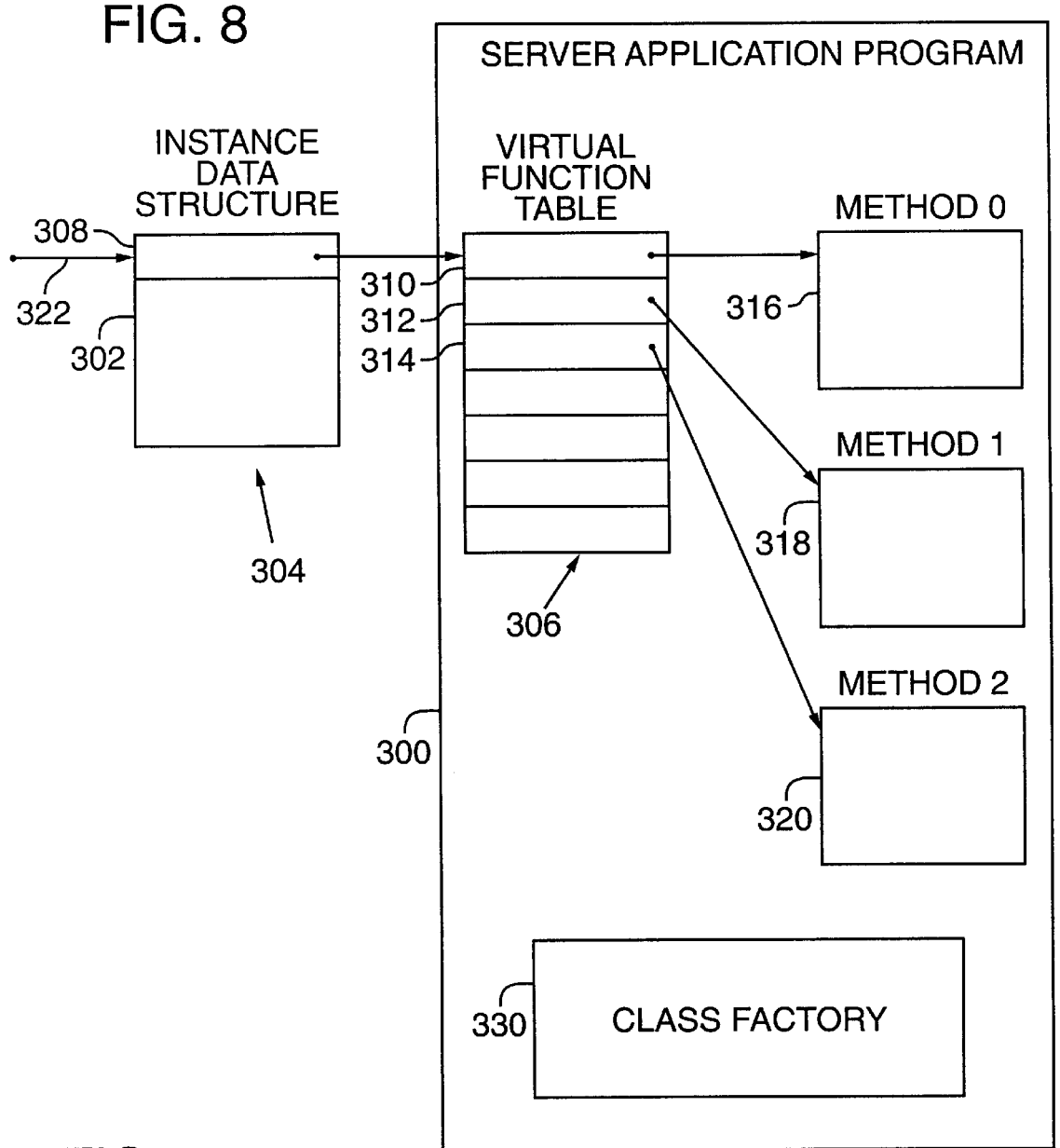
FIG. 8 is a diagram illustrating an example of a COM server and its relationship with an instance of object data.

OLE's COM specification defines binary standards for objects and their interfaces which facilitate the integration of software components. FIG. 8 is a diagram illustrating an example of a COM server 300 and its relationship with an instance of object data 302. According to the COM specification, an instance of an object is represented in the computer system 20 (FIG. 1) by an instance data structure 304 and a virtual function table 306. The instance data structure 304 contains a pointer 308 to the virtual function table 306 and data 302 (also referred to as data members, or properties of the object). A pointer is a data value that holds the address of an item in memory. The virtual function table 306 contains entries 310–314 for member functions 316–320 implemented in the server. Each of the entries 310–314 contains a reference to the code 316–320 that implements the corresponding member function.

An interface to an object is a group of semantically related functions that are publicly accessible to software that wishes to use the object (e.g., a client program). The interface is implemented in the computer memory as a block of the memory containing an array of function pointers, illustrated as the function table 306 in Fig. 8. The interface's definition are the names for each function in the virtual function table. An object may support more than one interface. If an object has more than one interface, the object has a function table and corresponding set of related functions for each interface.

Client programs interact with the object by obtaining a pointer (referred to as an interface pointer) 322 to the pointer 308 of the virtual function table 306. OLE includes a type definition of an interface pointer which allows client programs to call member functions on the interface by name through the interface pointer and provides type checking on the function's arguments, as expressed in the following code (in the C++ programming language):

pInterface->MemberFunction( . . . )

By convention, the interfaces of an object are illustrated graphically as a plug-in jack. Also, Interfaces conventionally are given names beginning with a capital "I." Objects can include multiple interfaces which are implemented with one or more virtual function tables. The member function of an interface is denoted as "IinterfaceName::FunctionName."

Figure 9:
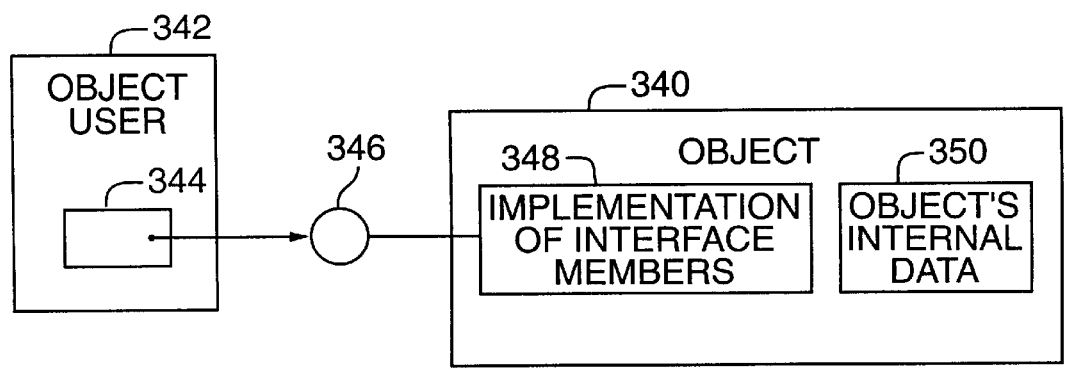
FIG. 9 is a conceptual diagram illustrating the relationship between a COM object and a user of the object (such as a client program).

FIG. 9 is a conceptual diagram illustrating the relationship between a COM object 340 and a user 342 of the object (such as a client program). The user of the object has a pointer 344 to the one of the object's interfaces, which is represented by a plug-in jack 346. The object includes code 348 implementing the member functions in the object's interface, and it also includes the encapsulated data 350, accessible via the object's interface. An OLE server, such as the animation server, can include a number of interfaces which allow clients of the server to access an instance of an object, such as an interactive character animation encapsulated within an object.

The object conforming to the COM specification exhibits data encapsulation by exposing its interfaces to client programs. The client programs interact with the object by calling the member functions 348 on a particular interface of the object, but do not directly manipulate the object's data 350. A COM object also exhibits polymorphism and inheritance in that it can provide interfaces in common with a base class and other similar objects, so that client programs can interact with each of the objects in the same manner by calling member functions of the interface that the objects have in common.

OLE Server Overview

To describe an OLE server, we turn again to the example in FIG. 8. The virtual function table 306 and member functions 316–320 of the object are provided by a server program 300 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows® 95 operating system in a same process with a client application program. Executable program files are loaded by the operating system as a separately executing process. In the OLE specification, the server application 300 includes code for the virtual function table 306 (FIG. 8) and member functions 316–320 (FIG. 8) of the classes that it supports, and also includes a class factory 330 that generates the instance data structure 304 (FIG. 8) for an object of the class.

A server program can be written by a programmer to support a particular class of object that contains any desired data. The animation server, for example, provides objects representing an interactive animation. This allows a client program (such as the clients shown in FIG. 3) to interact with the interactive animation through interfaces of the OLE object.

For the client program to interact with an instance of a COM object provided by the server 300, the server must first create the object (i.e., instantiate an object of a class supported by the server application) and the client must gain an interface pointer to the object (pointer 322, for example). In OLE, the client program realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows7 operating system in a file named "OLE32.DLL."

In OLE, classes of objects are uniquely associated with class identifiers ("CLSIDs"). Class identifiers are 128-bit globally unique identifiers ("GuIID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program can call to request creation of an object to encapsulate a particular animation's data using a CLSID associated with the data. The CoCreateInstance API function creates an instance of the object and returns a pointer of the requested interface to the client program.

Once the client program has obtained a first interface pointer to the object, the client obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client obtains to an interface of the object 80 can be used to call the QueryInterface function.

As noted above, the animation server is implemented as an "OLE Automation server." The term "automation" in this context refers to how the OLE object exposes a set of commands or functions that another piece of code can invoke. OLE automation enables an application to control another application's objects programmatically. In other words, automation provides a way for a program to manipulate an application's objects from outside the application.

In OLE automation, a software object exposes itself as a series of methods, properties and events. A property is an attribute, such as a color, the zip code section or the postal code section of an address, or another object. A method generally refers to a request to an object to perform a specific action. Finally, an event is a notification from an object that something has happened. An event is similar to a method call except that it occurs from the object to its client.

Properties have data types. For example, the postal code section of an address can be a string or a long integer. Properties can also be parameterized, which is useful to construct an array of one type representing a collection of properties (e.g., the lines of an address). In this type of property, a parameter representing an index in the array is defined for the property. Methods can also take parameters and return results.

OLE automation also allows for hierarchies of automation objects by allowing methods and properties to return pointers to other objects. For example a series of related attributes can be represented within an object, which represents each of the attributes as a property.

In OLE, a software object's properties and methods can be exposed to outside applications through 1) a standard OLE interface called IDispatch, and 2) through interface methods and property access functions that applications can call directly. IDispatch provides outside access to an object's methods and properties through one of its methods called the Invoke method. For instance, a program can ask an OLE object to return a property or can call one of its methods by calling the Invoke method on the IDispatch interface of the object and identifying the property or method by its ID. The IDispatch interface includes other methods to enable a program to get an ID of a method or property, and to get data type information. An OLE object can expose methods that can be called directly, rather than through the Invoke method in the IDispatch interface. For example, an OLE object can expose a set of functions that is derived from IDispatch and includes method and property access functions that another program can call directly. This is sometimes called a 'dual' interface because other programs can invoke an object's methods through the Idispatch interface and directly through this second type of interface.

An OLE control is a type of OLE object that uses OLE Automation to expose properties and methods and to provide support for events. An OLE control object is typically designed to be incorporated into a host application called a container. In the context of OLE controls, an event is a notification from the control to its container that something has happened. In OLE controls, events are typically implemented as standard OLE automation methods, except that the automation interface for these methods is implemented in the container, not the control. When a control wants to fire an event, it calls the container method associated with the event. For instance, the control can call the proper container method to fire the event through the IDispatch:: Invoke method of the container.

An OLE object can tell another object that it is the consumer of the other object's interface through a mechanism known as a connection point. A connection point is an interface exposed by an object that is used to hook up to an implementation of an interface with which the object wants to communicate. In the case of control events, a control describes the event interface in terms of an OLE automation interface in its type library, marking the interface as "source." This means that the control does not implement the interface. The control then provides a connection point through which the container can connect its implementation. A connection point can be defined as an implementation of the IConnectionPoint interface. The container gets the connection point through another interface called IConnectionPointContainer, which allows an external object to iterate list of connection points maintained by a control.

The Animation Server

Figure 10:
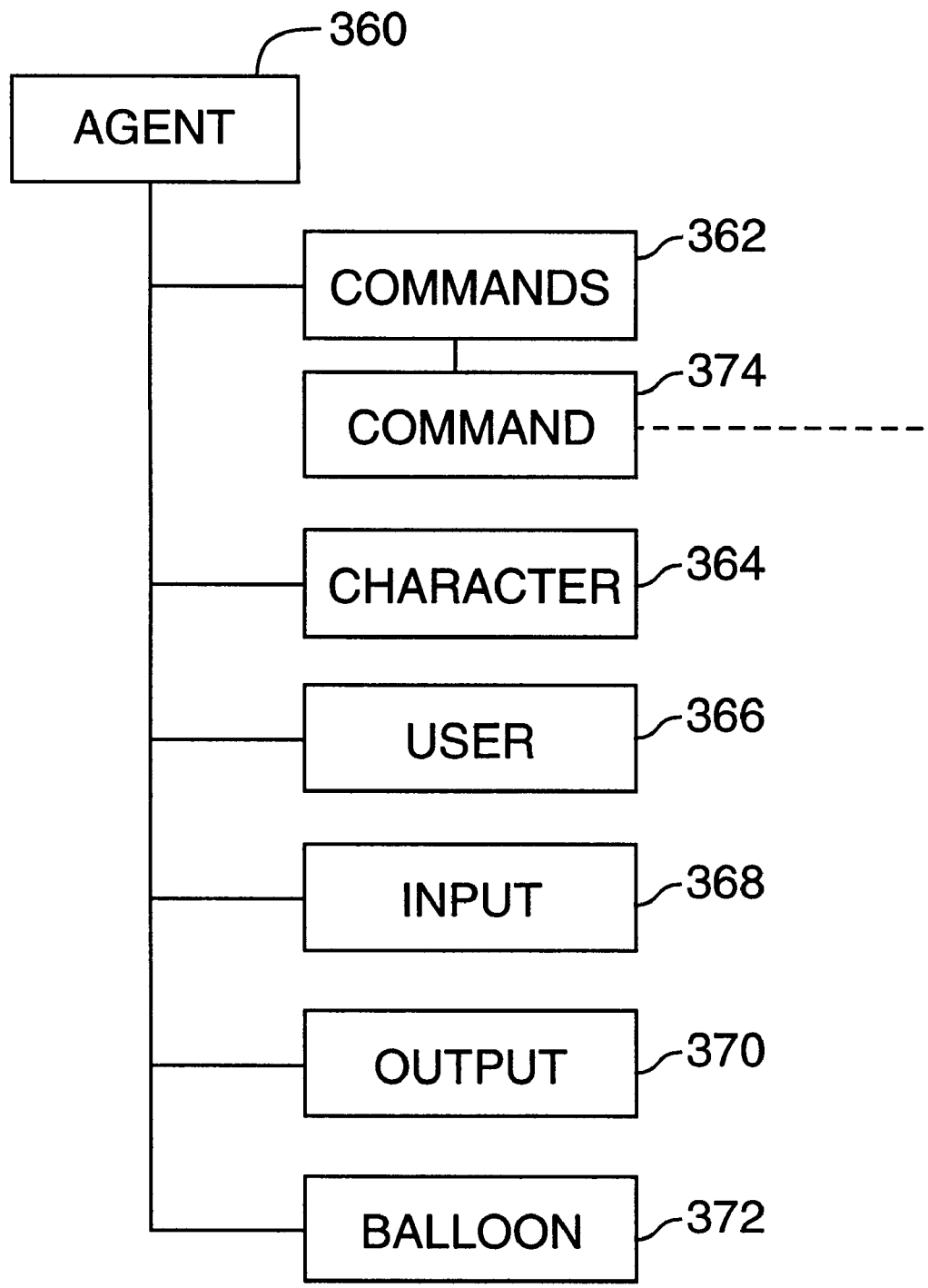
FIG. 10 illustrates the relationship among the different types of objects supported in the animation server.

The animation server shown in FIG. 3 is implemented as an OLE Server. FIG. 10 illustrates the hierarchy of the objects supported in the animation server. The top level object is the agent object 360, which represents an interactive, animated user interface character called an agent. An example of this type of character is the genie in FIG. 2.

The other objects include a commands object 362, character objects 364, a user object 366, an input object 368, an output object 370 and a balloon object 372. The commands object can have several command objects 374, which represent individual input commands that a client has specified for an agent.

Below, we describe the methods, properties and events that make up the interfaces to the objects supported in the animation server. Clients can include code that directly invokes the objects implemented in the animation server using ActiveX (OLE) interfaces. Alternatively, a client can access the methods, properties and events of the objects implemented in the animation server through an OLE control representing an animated character. For example in the Visual Basic Programming Environment from Microsoft, software developers can insert an OLE control representing an animated character into a Visual Basic form. The Visual Basic programming environment gives the developer high level access to the methods, properties and events of the animation server using conventional Visual Basic syntax. A description of examples of the methods properties and events that OLE controls expose follows below.

The OLE control acts as a high level programming interface to the animation server. When a piece of code, such as a Visual Basic application program, invokes a method or property on the OLE control, the OLE control routes the method or property request to the corresponding method or property in the animation server. The OLE control, thus, acts as a thin software layer that enables programmatic access to the methods and properties of the software objects in the animation server. The Visual Basic programming environment also provides support for receiving event notification from the animation server. When the developer inserts a control representing a character into a Visual Basic form and creates a Visual Basic application, the Visual Basic programming environment adds the necessary support for receiving event notification to the application. This event notification mechanism is similar to the event notification mechanism used to communicate events from an OLE control to a container of an OLE control.

In a typical implementation of a Visual Basic application that includes an animated character control, the operating system dynamically loads the character control in the process space of the application. The Visual Basic application can access the methods and properties of the control, which in turn, accesses the corresponding methods and properties in the animation server running in a separate process.

The OLE control based design also enables developers to create script code in Visual Basic Script that accesses the methods, properties and events of the animation server through the OLE control interface. One important use of this technology is adding an animated character to an HTML document and controlling the character through script code in the document. In this particular use of the invention, the HTML document is parsed and rendered by an application program, such as an Internet browser application. In one possible implementation, the browser loads the character control in its process space when it encounters an object identifier in the HTML page corresponding to the character control. When it encounters the script code in the HTML page, the browser uses an interpreter, loaded in its process space, to translate the script. To execute the script and allow it to access the animation server, the browser control communicates requests to access methods and properties to the interface of the in-process control, which in turn, accesses the corresponding methods and properties in the out of process animation server.

It is important to note that these uses of the animated character control are only examples. The invention does not necessarily require that the animation server be accessed through an OLE automation interface. There are alternative ways to access an out of process animation server, and the use of an OLE control is just one possible method of programmatically accessing the animation server.

We now turn to specific examples of the methods, properties and events of the objects implemented in the animation server. Below we describe methods, properties and events of the server's ActiveX control interface in more detail.

The Agent Object

Clients of the animation server access its animation services using the methods, properties and events of the agent object's interface. The methods of the agent object include a number of functions to control the playback of an animation. Example methods include: Play, GestureAt, MoveTo, Stop, and Speak.

Play—A client invokes this method to ask the server to play a specified animation sequence. The client specifies the animation sequence by passing a string that specifies the name of the animation sequence.

To display the requested animation, the server uses the animation technique described above in detail.

GestureAt—Clients use this method to cause the animation to gesture at a specified location. When invoking this method, the client provides two integer values representing the screen coordinates (x,y) in pixels where the character should gesture at. The character author assigns animations corresponding to different coordinates to this method, and at runtime, the server determines which of these animations to play based on the current location of the character and the coordinates specified by the client.

MoveTo—This method moves the animation to a specified location in screen coordinates.

Stop—Clients invoke this method to halt the current animation and play the next queued animation.

Speak—Clients invoke this method to instruct the server to generate speech output for a specified text string.

Clients specify a text string, which the speech output engine converts into digitized audio output.

The animation server plays lip synched animation of the agent's mouth along with the speech output. Once the speech synthesis engine and agent mouth data is loaded on an end user's machine, the server can play the ASCII text requested by a client. When the server processes a client request to speak, it passes the appropriate text to the speech synthesis engine. The speech synthesis engine then processes the text and begins sending data to the physical audio device (e.g., sound card installed in the PC).

The speech synthesis engine (item 116 in FIG. 3) can send a notification to the mouth animation module (item 114 in FIG. 3) of the server whenever a specific phoneme is about to be spoken. When the mouth animation module receives this notification, it performs a mapping of the specified phoneme to appropriate data stored in the animation mouth data file. The mouth data consists of an x,y coordinate, a width and height, and a compressed bitmap of a mouth that appropriately matches the phoneme to be spoken. The mouth bitmap can then be loaded from the data file into memory, decompressed, and drawn on top of the current frame that the server is currently displaying at the coordinates of the animation's mouth. This action is repeated for every phoneme that is synthesized by the speech synthesis engine. This gives the illusion that the character is actually speaking the synthesized audio.

It is important to note that the mouth bitmaps that correspond to the various phonemes that are generated are completely bounded by the region of the current animation frame. No region processing is performed during or as a result of the drawing of the mouth. In order to maintain lip synch with the above technique, the process of preparing and drawing the appropriate mouth for a specific phoneme must be done extremely fast. Performing any additional CPU intensive processing will result in the lip synching falling behind.

The server also embeds what are referred to as tags in every piece of text that is passed to the speech synthesis engine. These tags are inserted before every word in the text and tell the speech synthesis engine that the server wants to be notified whenever one of these tags is encountered. The server can then uses this data to display the word that is currently being spoken in a visual user interface. This technique can then be used effectively to close caption the text as it is being spoken. In this implementation, the server displays this text in a graphic representing a balloon.

The client can use a special type of tag called a bookmark tag in Speak method statement to sync its operations with the output text. The bookmark tag is a tag supplied by the client along with the ASCII text that tells the server when to notify the client. For example, to display a window at a particular point in its spoken output, the programmer inserts a bookmark tag at the desired location in the output string. When the server encounters the bookmark tag in the output text, it generates a Bookmark event with the bookmark number you specified in the tag.

Agent1. Speak "Generate a bookmark now\mrk=100\."

While generating speech output, the Speak method automatically selects the animation of the agent based on the last animation played. The Speak method uses the last action played to determine which speaking animation to play. For example, if the client precedes the Speak command with a command to play an animation called GestureRight, the server will play GestureRight animation and then the GestureRight speaking animation. However, if the preceding animation ends at the rest pose, the server will play the RestPose speaking animation.

Playing a speaking animation also automatically disables the listening mode while the associated animation is played.

Agent Object Events

In general, events are notifications from the animation server that something has happened for which a client should be notified. They, for the most part, are asynchronous, but in some cases, can be synchronous. In this context, asynchronous means that the piece of code that monitors the event spawns a separate thread to fire the event so that the code can continue processing after it fires the event. Synchronous means that the piece of code that monitors the event does not spawn a separate thread to fire the event but instead, fires the event on the current thread of execution and waits until the event is processed before continuing. In the case of the animation server, the server is responsible for firing events to clients, whether they are application programs or a character control within an application program (such as a Visual Basic application) or a script (such as a Visual Basic Script embedded in an HTML document). In the latter case of a character control, the control acts as a gateway for communicating events.

Most of the events generated in the OLE implementation of the animation server are asynchronous, meaning that they spawn a separate thread to fire an event. This is beneficial to performance because the animation server can continue executing without waiting for the client to finish processing an event. However, some events, like QueryServerShutdown, are synchronous because it is important for the server to wait for the client to finish processing the event before continuing.

One form of event notification is a callback function where the client requesting notification of an event provides the name and location of a function to call when a predefined event occurs. For example in OLE, this callback can be implemented as an IDispatch interface of the client that the animation server can invoke when it detects an event. has occurred. For asynchronous events, the callback function is made on a separate thread of execution, while for synchronous events, the callback is made on the same thread.

The agent object's events allow the client program to track the state of an agent. Examples of these types of events include: Input Activate, Input Deactivate, Command, Shutdown, Bookmark.

Input Activate event—The server generates this event when a client becomes active for input from the server.

Input Deactivate event—The server generates this event when a client has been deactivated for input from the server.

The server uses the activate and deactivate events to arbitrate among requests from clients for input services. The active client is the client that receives mouse and speech input from the server.

Bookmark event—The server generates this event when it encounters a bookmark tag in a text string as it converts the text string into speech output. The client can insert this tag in the text string provided with a Speak method. To distinguish between bookmark tags, the client specifies a tag ID for the bookmark when it passes the text to the server.

Command event—This event occurs then the user chooses an input command of an agent (e.g., clicks on the agent's command window). In one implementation of the agent, right-clicking the mouse button while the cursor is positioned over the character displays a pop-up menu, selecting Open Commands Window from this menu displays the agent's command window. This command window is one way to implement a visual command interface for an agent object. It displays one or more visual input commands by displaying the text caption provided by the client. The user can select one of these input commands by positioning the cursor over the caption and clicking on the mouse button. We sometimes refer to this form of visual input as cursor device input because the user can enter an input command using a cursor device such as a mouse or trackball.

The command event tells the client which input command the user has provided by specifying a command object. The command object provides access to a number of properties of the command object as set forth in the table below.

Resume event—This event occurs when the animation resumes after being suspended. The end user can resume the animation by clicking on a suspend caption in the pop-up window associated with the agent.

Shutdown event—This occurs when the server shuts down.

StopListening—This event occurs when the server is no longer in the listening mode. This means that the character will not respond to speech commands.

The Character Object

The character object provides access to the properties of a character. These are not the same as the properties of the control. The user can change the properties of a character, but the values of these properties are read-only to client applications to avoid arbitrary changes to the user-specified settings. The properties of a character include:

Height—This property is an integer representing the height of a character in pixels.

Width—This is an integer representing the width of the character in pixels.

Left—This property is an integer that specifies the left edge of the current character frame. The Left property is expressed in pixels, relative to screen origin (upper left).

Top—This property is an integer that specifies the top edge of the current character frame. The Top property is expressed in pixels, relative to screen origin (upper left).

Even though the character appears in an irregularly shaped region window, the Height, Width, Left and Top properties of the character are based on the external dimensions of the rectangular animation frame used when it was created. Clients use the MoveTo method of the agent to change the character's position.

The character object includes the following properties relating to speech input and output: Listening, Pitch, Speed, and Volume.

Listening—This is a boolean value that indicates whether the agent is in listening mode.

Pitch, Speed, and Volume—These are read only integer values representing the pitch, speed, and volume of the speech output. In this implementation, the client is not allowed to alter these values directly. The client can, however, alter pitch, speed, and volume by embedding speech tags in the text string provided with a Speak method request. For example, the client can use a speed tag to alter the pitch and speed of speech output, and can use a volume tag to change the volume for a portion of the speech output.

| Value | Description |
| --- | --- |
| User Input | Identifies the command object returned by the server. The following properties can be accessed from the common object. |
| Name | A string value identifying the name (ID) of the command. |
| Confidence | a long integer value indicating the confidence scoring for the command |
| Voice | A string value identifying the voice text for the command |
| Alt 1 Name | A string value identifying the name of the next (second) best command. |
| Alt 1 Confidence | A long integer value indicating the confidence scoring for the best command |
| Alt 1 Voice | A string value identifying the voice text for the next (second) best command match |
| Alt 2 Name | A string value identifying the name of third best command match. |
| Alt 2 Confidence | A long integer identifying the confidence scoring for the third match. |
| Alt 2 Voice | A string value identicating the voice text for the third best command. |
| Count | an integer value indicating the number of alternatives returned. |

The input and output object provide read only access to an The Input and Output Objectsagent's input properties and output properties.

The Commands Object

The commands object enables clients to specify a collection of commands that an agent object will respond to when a client becomes active. The server maintains a list of commands that are currently available to the user. This list includes commands that the server defines for general interaction, such as Stop Listening and Go Away; the list of available (but inactive) clients; and the commands defined by the current active client. The first two sets of commands are global commands; that is, they are available at any time, regardless of which client is active. Client-defined commands are available only when that client is active.

Each client application defines a collection of commands called the Commands object. To add a command to the Commands object, the client uses the Add or Insert methods of the commands object. For each command in the collection, the client can specify whether the user accesses the command through the Commands window, the application's (including Web page's) own interface controls, or both. For example, if the programmer wants a command to appear on the Commands window, she sets the command's Caption and Visible properties.

The client can also set the Voice property for a command, which enables its selection through speech recognition.

The client can add separator lines to your Commands object to group sets of commands in the Commands window. The client can also remove commands and separators.

Here's an example using VB Script, where Agent1 is the name (ID) for the agent control:

Agent1. Commands.Add "GetTime", "Current Time", "what's the current time"
Agent1.Commands.Add "GetDate", "Current Date", "what's the current date"
Agent1. Commands.Add "GetName", "Current Name", "what's your name"

In this example, the first line of code first disables the commands by setting the Enabled property to false. The following lines invoke the Add method to add commands to the commands window of the agent.

The server supports the following methods for the Commands object: Add, Insert, Remove, and RemoveAll.

The Add method adds a command to the Commands object. The client can also specify the caption, voice text, visual state, and enabled state for the command.

The Insert method inserts a command in the Commands object. The client specifies the command ID of the command to be inserted, a name of the command object to which the new command is related to, and value indicating whether the command should be inserted before or after the related command. The client can optionally specify a text string that will appear in the Commands window for the inserted command when the client is active.

For speech input, the client specifies the string value corresponding to the words or phrase to be used by the speech engine to recognize this command.

The Remove method removes a client command object (command or separator) from the Commands object. The client specifies a string value corresponding to the ID for the command or separator.

The RemoveAll method removes all client command objects (commands and separators) from the Commands object. Command objects that are removed from the collection do not display when the agent control is active.

The server supports the following properties for the Commands object: Caption, Count, Visible, and Voice.

The Caption property is a text string describing the text displayed for the Commands object in the Commands window.

The Count property returns an integer (read-only property) that specifies the count of commands in the Commands object.

The Visible property is a boolean value that determines whether the option of the Commands object is visible.

The Voice property is a text string corresponding to the words or phrase to be used by the speech engine for recognizing this command.

The string expression can include square bracket characters ([ ]) to indicate optional words and lists strings enclosed in parenthesis and separated by vertical bar characters (|) to indicate alternative strings. Alternates must be enclosed in parentheses. For example, "(hello [there]|hi)" tells the speech engine to accept "hello," "hello there," or "hi" for the command.

The client can also use an ellipsis ( . . . ) to support word spotting, that is, telling the speech engine to ignore words spoken in this position in the phrase, sometimes called garbage words. When ellipses are used, the speech engine recognizes only specific words in the string regardless of adjacent words or phrases. For example, if you set this property to ". . . check mail . . . " the speech recognition engine will match phrases like "Please check mail," or "Check mail, please" to this command. Ellipses can be used anywhere within a string.

The Command Object

A command is an item in a Commands collection. The server provides access to the commands specified by a client when the client is active.

For each command that the client specifies, it can define whether it will be accessible in the Commands window by using the Caption, Visible, and Enabled properties.

In addition, the client can set the words or phrases that it wishes the server to use to match speech input for a command.

When the server receives input for a command object, it sends a Command event, and passes back the name of the command as an attribute of the UserInput Object. The client can then use conditional statements to match and process the command.

Properties of the Command Object

Each command defined in a Commands object also has properties that affect the how the server presents the command. For example, if you supply content for the Voice property of a command, the supplied text is automatically compiled as part of the active vocabulary of the speech recognition engine, allowing speech recognition when the client activates its Commands object. Individual commands in a Commands collection also have a Visible property. When this property is set to True, the command will appear on the agent's pop-up Commands window. A client does not have to include any or all of your commands in the agent's Commands window, if it already provides its own interface for those commands. For example, a form may already display controls that enable user interaction. In this case, the client would not need to include access on the agent's Commands window, yet it can still provide speech access to those controls (by defining command objects for those fields).

The following Command properties are supported: Caption, Confidence, Enabled, Visible, and Voice.

The Caption property determines the text displayed for the command in the Commands window. The property is a string expression displayed as the caption for the command.

The Confidence property is the confidence threshold that the speech engine uses to match the command. The property is a numeric expression that evaluates to an integer that identifies confidence value for the command.

The Enabled property indicates whether the command is currently enabled. The property is represented as a boolean expression specifying whether the object is visible or hidden. If True, the command is enabled. If False, the command is disabled. If the Enabled property of the command's parent Commands object is set to False, the Enabled property of the command will also be automatically disabled. However, the Enabled property setting of the command is restored when the Enabled property of the parent Commands object is set to True.

The Visible property indicates whether the caption of the command is visible. The Voice property is string value corresponding to the words or phrase to be used by the speech engine for recognizing this command. A string expression can include square bracket characters ([ ]) to indicate optional words and lists of strings enclosed in parenthesis and separated by vertical bar characters (|) to indicate alternative strings. Alternates must be enclosed in parentheses. For example, "(hello [there]|hi)" tells the speech engine to accept "hello," "hello there," or "hi" for the command.

The Balloon Object

The word balloon object displays the "spoken" text of the agent. The server exposes the setting of the Enabled property as read-only. When Enabled property is set, the word balloon is automatically displayed and removed for "spoken" output. This property value is set by the user in one of the windows used to display the agent's properties. The client can define text in the balloon to appear differently than the spoken output by using the Map tag. For more information about this tag, see Speech Output Tags.

Speech Output Tags

The Agent services support modifying the speech output special tags inserted in the speech text string. This allows the client to add personality to the output expression of the character. Speech output tags use the following rules of syntax in this implementation:

1. All tags begin and end with a backslash character (\).
2. The backslash character is not allowed within a tag. To include a backslash character in tagged text, but outside of a tag, use a double backslash (\\).
3. Tags are case-insensitive. For example, \pit\ is the same as \PIT\.
4. Tags are white-space sensitive. For example, \Rst\ is not the same as \Rst\.

Unless otherwise specified, the speech output retains the characteristic set by the tag within the text specified in a single Speak method, unless modified by another tag. Speech output is automatically reset to the user-defined parameters after a Speak method is completed.

The following tags are supported:
Chr, Ctx, Emp, Map, Mrk, Pau, Pit, Rst, Spd, Vol Chr
Description Sets the character of the voice.
Syntax \Chr=string\

| Part | Description |
|---|---|
| string | a string specifying the character of the voice. If "Normal" (the default), the character speaks in a normal tone of voice. If "Monotone," the character speaks in a monotone voice. If "Whisper" the character whispers. |

Ctx
Description

Sets the context of the output text.
Syntax

\Ctx=string\

| Part | Description |
|---|---|
| string | A string specifying the context of the text that follows, which determines how symbols or abbreviations are spoken. If "Address," addresses and/or phone numbers are used. If "Email," electronic mail is used. If "Unknown," (default) the Context is unknown. |

Emp
Description

Emphasizes the next word spoken. This tag must immediately adjoin the word.
Syntax \Emp\
Map
Description Maps spoken text to text displayed in the word balloon.

Syntax

\Map=\SpokenText"="BalloonText"\

| Part | Description |
|---|---|
| SpokenText | A string specifying the text for spoken output. |
| BalloonText | A string specifying the text to appear in the word balloon. |

Remarks
This tag enables the programmer to use spoken text that is different than the text displayed in the word balloon Mrk
Description Indicates a bookmark in the text. (See also the Bookmark event.) Number must be greater than zero Syntax \Mrk=number\

| Part | Description |
|---|---|
| number | The number of the bookmark. |

Remarks
When the server processes a bookmark, it generates a bookmark event.

Pau
Description

Pauses speech for the specified number of milliseconds.

Syntax

\Pau=number\

| Part | Description |
|---|---|
| number | The number of milliseconds to pause. |

Remarks
The speech engine supplied with the Animation Server supports values from 10 (0.01 sec) to 2550 (2.55 sec).

Pit
Description

Sets the baseline pitch of the output to the specified value in hertz.

Syntax

\Pit=number\

| Part | Description |
|---|---|
| number | The pitch in hertz. |

Remarks
The speech engine supplied with this implementation of the animation server supports values from 50 to 400.

Rst
Description

Resets all tags to the default settings.

Syntax

\Rst\

Spd
Description

Sets the baseline average talking speed of the speech output.

Syntax

\Spd=number\

| Part | Description |
|---|---|
| number | Baseline average talking speed, in words per minute. |

Remarks
The speech engine supplied with Microsoft Agent supports values from 50 to 250.

Vol

-continued

Description

Sets the baseline speaking volume of the speech output.
Syntax

\Vol=number\

| Part | Description |
|---|---|
| number | Baseline speaking volume; 0 is silence and 65535 is maximum. |

Having described an implementation of the animation server and its interface, we now describe how the server interacts with clients requesting animation services.

The first step that a client performs is to attach to the server. This is performed using a standard OLE mechanism which starts the server if it is not already running. The server maintains a list of all connected clients and terminates when either the last client detaches or it is explicitly shut down by the end user. This functionality is consistent with the COM specification.

Once the server is started, the client continues with the process of attaching by registering a notification interface with the server. The notification interface is used by the server whenever it needs to communicate either events or state changes with its connected clients. Notifications from the server to connected clients usually occur on a separate thread of execution in the server. This is necessary in order to prevent any single client from blocking the server while it is processing a notification.

Once a connection to the server is established, clients can request services from the agent server. These services consist of region window animations, lip synched animation, synthesized digital audio output, and input command processing. The animation services allow clients to trigger animation sequences in the agent. To accomplish this, the client calls the Play methods on the agent object's interface.

The server can also animate the agent object at any time but gives priority to the active client except in cases where it is deemed necessary to override the default behavior. The active state of a client can be set by either the end user (if the client allows it) or the client itself Only one externally connected client is considered active at any time. The server also implements what are known as internal clients. These clients typically follow the same rules as external clients but can override the default behavior of the server if deemed necessary.

Whenever a client becomes input active it is sent a notification from the server in the form of an input Activate event. This activation is analogous to a window gaining the input focus in the Windows® Operating System. Upon activation, the client receives input from the server. The active client will also be sent a notification (i.e. an input Deactivate event) from the server when it is about to become inactive (analogous to KillFocus).

Clients can explicitly make themselves input active however they should always be prepared to handle the case that another client has "stolen" the activation focus from them. This model works because it is ultimately the end user that is controlling which client has the chance to become active through either direct communication with the server or one of its connected clients.

If there are no requests, the server enters what is referred to as its idle state. When the server is idle, it causes the agent to play one of its idle animations picked at random. Before playing an idle animation, the server will first try to play a transitional animation to smoothly move the agent from its current position to a constant position known as the rest pose. All idle animations begin at the rest pose. Transitioning the agent through a constant position reduces the amount of jerkiness associated with quickly changing the state of the agent. This gives the agent a more natural feel. The server's idle animations will always be interrupted by an incoming client request.

If there are requests in the queue, the next request is popped off of the queue and the appropriate action is taken by the server. This process continues until the request queue is empty.

Because of the asynchronous nature of the agent's playback mechanism, it is important to implement a method that allows clients to notify themselves when a particular event has been triggered in the server. This is necessary for synchronizing events in the server with events in the client.

Consider the example where a client wants to play an animation that causes the agent to gesture at a particular location on the screen, display its own window, and then have the agent speak something to the user.

The server implements two mechanisms for allowing clients to synchronize their own actions with the servers. The first allows clients to add specific notification requests to the server's request queue. The server will process these notification requests with the same rules that it processes animation or audio requests. When the server encounters a notification request in the request queue, it simply sends the notification to the client that posted the request. This type of notification is acceptable for many synchronizing functions.

The other mechanism allows clients to embed notification requests in text that is to be synthesized into digital audio output. The bookmark tags, described above, are in implementation of this type of notification request. These notification requests offer a finer granularity than the previously described mechanism in that it allows clients to synchronize actions at the spoken word level.

Visual and Speech Input Command Notification

Above we described the methods and properties of the animation server that enable a client to specify input commands that an agent will respond to when the client is active. In the implementation of the server described above, these input commands include: 1) commands defined by the server and 2) commands defined by clients.

The server monitors for these client-specific commands as well as global commands and sends a notification to the appropriate client when it detects the input command. When the end user selects a command, via either the visual command interface or through a spoken command, the server sends a notification to the appropriate client that a command was selected. In this implementation, the server provides a notification in the form of a command event of the agent object.

The notification tells the client the name of the command that was selected along with other information from the speech recognition engine if the command was selected via a spoken command. One of the pieces of information that the server passes to the client though this interface is a confidence value for the command. This value represents how confident the speech recognition engine was that the command being passed to the client was actually spoken. Other information consists of possible alternatives to the spoken command and their confidences. Clients can use this information to determine whether the engine's confidence in the spoken command was sufficiently high enough for the client to actually proceed with the processing of the command, or if they should ask the user for verification of the command. It is more effective to allow clients to do this processing instead of the server because they have context information which may be useful in determining whether to accept a command or reject it.

The client server architecture described above enables software developers to create clients that take advantage of the animation and speech services of the server. Clients can request services from the server using a C/C++COM Application Programming Interface (API) or via an ActiveX control interface. Developers, therefore, can create client application programmers written in C or C++, or written in Visual Basic from Microsoft Corp. For example, C or C++ programs can access the server functionality through the server's COM API. Using the Visual Basic Programming system, programmers can drag and drop an agent object's ActiveX control into a Visual Basic form.

The ActiveX control interface also enables developers to access the animation services in Web pages using scripting languages compatible with ActiveX controls like VBScript (Visual Basic Scripting Edition from Microsoft Corp.) or Java Script. The programmer can access the server from a web page by declaring the object on the page, providing a name for the object for easy reference.

To access the services of the animation server from a Web page, the programmer uses the HTML Object tag to declare the control in the Head or Body section of the page.

To use a method or property in VBScript (or Visual Basic®), the programmer uses the conventional syntax for methods, properties, and events. Examples of this syntax are set forth below:
agent.object.Method argument
agent.object.Property=value
agent.object$_{13}$Event (argument as datatype)

Before describing how agent objects are created and accessed via Web scripts in more detail, we provide an overview of the browser software used to access web pages and process Web scripts.

Figure 11:
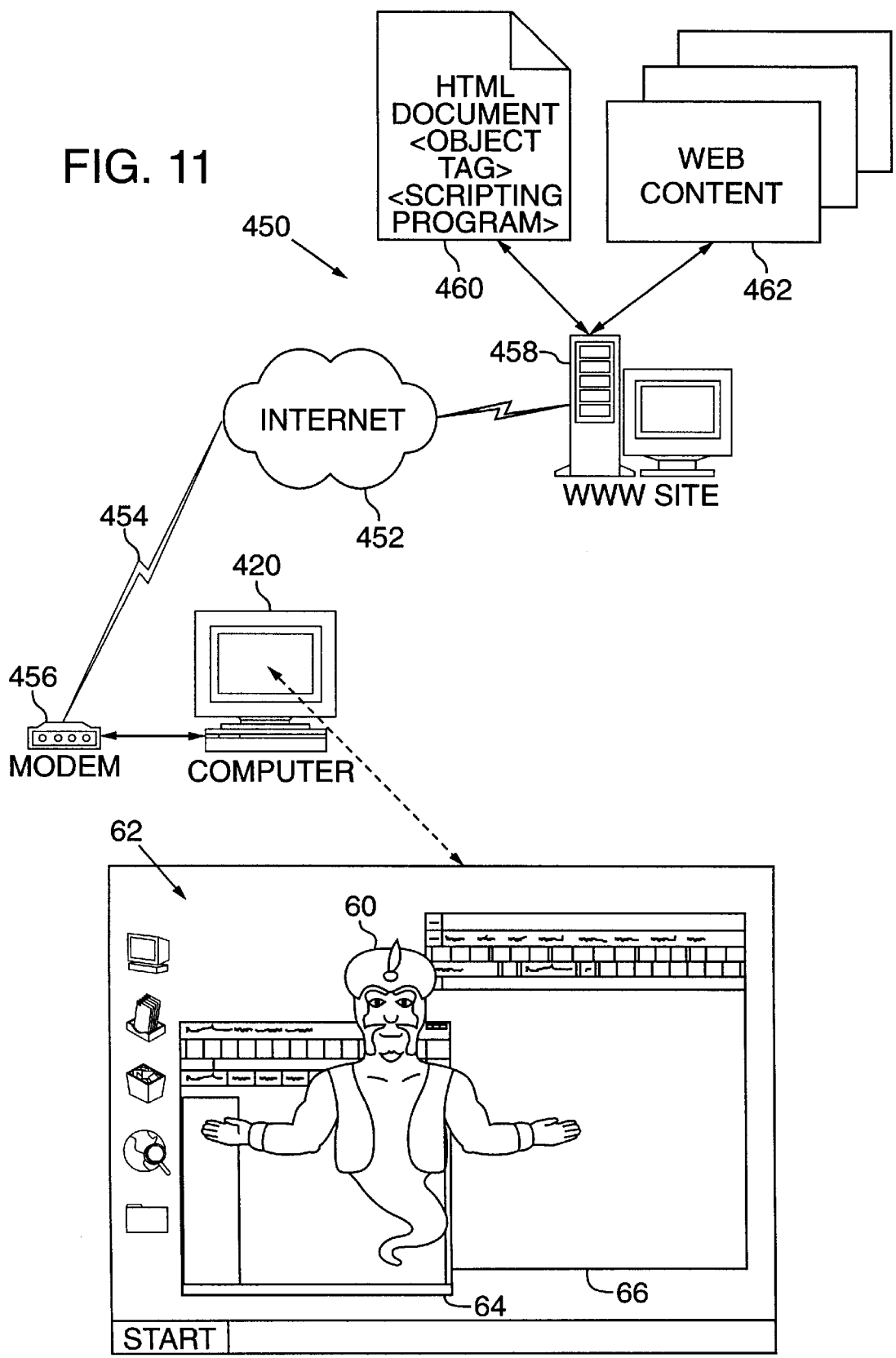
FIG. 11 is a diagram of a web browsing environment illustrating how interactive, animated user interface characters can be activated from Web pages.

FIG. 11 is a diagram illustrating a Web browsing environment 450 for accessing a Web page with an embedded agent object. In the Web browsing environment shown in FIG. 11, the computer 20 (also shown in FIG. 1) runs software, referred to herein as a "browser," for browsing of electronic documents and other data from local sources (e.g., the secondary storage 42 of FIG. 1) and from a remote computer network 452. The browser can be integrated with the operating system software, or can be a separate application software. The remote computer network 452 shown in FIG. 11 is the Internet.

The computer 20 connects to the Internet 452 over a telephone line 454 with a modem 456. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. Although we specifically refer to the Internet here, this browsing environment also applies to other public or private computer networks, such as a computer network of a commercial on-line service or an internal corporate local area network (LAN), an intranet, or similar computer network.

Web pages and other files compatible for browsing via the browser software can reside as files of a file system stored in the computer's secondary storage 42 (FIG. 1), or reside as resources at a remote computer 458 (also referred to as a "site") connected to the computer network 452, such as a world-wide web site on the Internet. The example Web page 460 residing at the site 458 conforms with HTML standards and also includes an object tag and scripting program. The web page may also refer to additional information content 462, such as images, audio, video, executable programs, etc. (hereafter simply "Web content" 462), which also reside at the remote computer 458. The document 460 and Web content 462 are stored as files in a file system of the remote computer 458. The document 460 incorporates the Web content 462 using HTML tags that specify the location of files or other Internet resource containing the Web content on the Internet 452.

When used for browsing documents, the browser displays the document in a window the computer's user interface allocated to the browser by the operating system. FIG. 11 depicts the screen shot of FIG. 2 as an example of the image displayed on the computer's monitor. One of the windows 64 acts as the user interface of the browser.

When the browser renders the Web page, it identifies the HTML Object tag of the agent object embedded in the web page. In response, it creates an instance of the agent object and displays it on the user interface of the computer.

As explained in detail above, the agent's animation is not confined to the window of a host application, but rather, is displayed in region window bounng a bounding region that matches the bounding region of the animation. FIG. 11 shows how the genie character plays outside the window of the Internet browser's window.

The format of the HTML object tag is as follows:
<OBJECT classid=codebase=data=height=width=>

The classid parameter of this tag (if present) specifies a class identifier of the control. As the web browser renders the web page, it uses the class identifier to create the control, such as by calling the CoCreateInstance API function to cause the control's server application to be loaded and the server application's class factory to instantiate the control. The codebase parameter (if present) specifies a URL of a file containing the control (such as on the Internet). If the control is not installed on the end user's computer, the web browser can retrieve this file using the URL from the Internet and then install the file on the computer before instantiating the control using its class identifier. The data tag (if present) specifies persistent data for the control as either a text string or via a URL of a file containing the control's persistent data.

The specific format of an agent object is as follows:

```
<OBJECT
classid="clsid:855b244c-fc5b-11CF-91fe-00c04fd701a5"
id=Agent
>
</OBJECT>
```

Before displaying the web page, the web browser parses the HTML object embedding tags along with the other HTML format data in the hypertext documents. On encountering the HTML object embedding tag for an agent object during the parsing, the web browser instantiates the agent object using the class identifiers specified in the tags. To accomplish this, the web browser invokes a standard OLE interface function that looks in a registry to determine which control the tag refers to and loads it in-process.

If the control is not installed on the computer 20 (FIG. 1), the web browser can download it and the server using the URLs specified as the codebase attribute of the tags (if any). As it renders the HTML code in the web page, the web browser displays the content of the hypertext page in its window.

As the browser renders the Web page, it also encounters the script. For Visual Basic Script, the browser loads a Visual Basic Script runtime interpreter locally to translate the Visual Basic script on-the-fly and run the code. If the browser supports other scripting languages, it loads the appropriate interpreter based on the script language identified in the document. When the browser encounters script code, it loads an appropriate interpreter for the script language, and this interpreter then translates the code. The script code executes via calls from the interpreter in response to references to the character control interface, which in this specific implementation is the OLE control interface described in detail above. In the specific case of Visual Basic Script, for example, the browser loads an interpreter in the process space of the browser. To execute the script code, the browser uses the interpreter to translate the code and then accesses the OLE control interface in response to references to the control interface in the script code. As noted above, the browser loads the OLE control representing the character into the process space of the browser when it encounters an object identifier called the object tag. Thus, in this particular implementation, both the control and the interpreter are loaded in the process space of the browser. When the script code references the character control, the browser accesses the animation server, which runs in a separate process, through the control interface. The control acts a gateway, routing requests for access to the animation server's methods and properties for a particular character to the animation server.

In order to describe the interactive behavior of the agent, the script in the Web page references the agent object and uses the control methods, properties and events to define the input commands and output behavior of the object. For example, the script can include conditional statements that describe the behavior of the agent when the client specified input commands are detected.

While we have described an implementation of a client server animation system in detail, it is important to note that the invention is not limited to this specific implementation. The COM object implementation of the server provides a number of advantages, but the server does not have to be implemented according to the COM specification. We have described an OLE based implementation for accessing the methods, properties and events of the software objects in the animation server. However, the client-server relationship between client programs and the animation server does not have to be implemented using OLE or using an OLE control automation interface. Equivalent functionality can be implemented using other object oriented programming models as well.

In view of the many possible embodiments to which the principles of our invention may be applied, it should be recognized that the implementations described above are only examples of the invention and should not be taken as a limitation on the scope of the invention. Rather, the scope of the invention is defined by the following claims. We therefore claim as our invention all that comes within the scope and spirit of these claims.

We claim:

1. A method for generating an interactive, animated character in the user interface of a computer using a client-server architecture, the method comprising:

in response to a request from a client, creating an instance of a character and displaying the character in the user interface;

in the server, receiving from a client a set of client-specified user input commands that the character will respond to, the set comprising cursor input from a cursor control device;

in the server, monitoring for the specified user input commands;

in the server, when one of the user input commands is detected, sending a notification to the client;

in the server, receiving from the client a request that is conditioned upon the notification from the server; and in response to the request from the client, playing back a client-specified sequence of animation output to animate the character in the user interface.

2. The method of claim 1 wherein the set of client-specified user input commands further comprises speech input received through a speech recognition engine, the method further comprising:

in response to a request from the client, playing back a client-specified sequence of animation to animate the character in the user interface and generating speech output lip-synched to animation representing a mouth of the character.

3. The method of claim 1 further including:

queuing requests to animate the character from the client when the character is currently playing back an animation;

immediately returning control to the client making the request to animate the character after determining that the character is busy; and deferring processing of the request until the current animation is complete.

4. The method of claim 1 further including: arbitrating requests to control the character from more than one client.

5. The method of claim 1 wherein the step of creating an instance of a character further comprises registering the client with the server, the method further comprising:

registering a second client with the server;

in the server, receiving from the second client a second set of client-specified user input commands that the character will respond to, the second set comprising cursor input from the cursor control device;

keeping track of clients that have registered with the server;

arbitrating requests to control the character from more than one client; and terminating the character when no clients are currently registered with the server.

6. The method of claim 1 wherein the step of creating an instance of the character comprises:

starting execution of the server in response to a request from the client;

in the server, registering a notification interface for the client in response to a request from the client; and in the server, receiving from the client a request telling the server which character to create.

7. The method of claim 1 including:

synchronizing execution of the client with the execution of the character by allowing the client to post notification requests with the server in a first in first out queue used to store animation requests while the character is currently being animated, and sending a notification from the server to the client when the first notification request is at the top of the queue.

8. The method of claim 7 wherein the notification requests are embedded with text that is synthesized into speech output by the server so that the client can synchronize itself to individual words in the speech output.

9. A computer readable medium on which is stored software for performing the method of claim 1.

10. A client-server animation system for generating interactive animated characters, the system comprising:

an animation server for receiving requests from clients to create a character on the user interface, for controlling playback of a sequence of frames of animation and lip synched speech output from the character on the user interface in response to requests from the clients, for receiving an identification of cursor device and speech input commands, and for notifying the clients when the server determines that the cursor device input and the speech input commands have been provided by a user;

a speech recognition engine in communication with an audio input device for receiving speech input from the user and for analyzing the speech input to identify the speech input commands; and in communication with the server for sending notification messages to the server when the speech input commands are detected; and a speech synthesis engine in communication with an audio output device for generating speech output, and in communication with the server for receiving requests to generate audio output corresponding to a text string provided by the clients via the server, and for notifying the server when a tag is detected in the text string so that the server can synchronize display of text in the text string with the speech output.

11. The animation system of claim 10 wherein the server includes a queue for queuing requests from clients to play specified sequences of animation of the character; and wherein the server keeps track of which of the clients is currently active and processes the requests in the queue corresponding to an active client.

12. The animation system of claim 10 wherein the server includes a mouth animation module for receiving notifications from the speech synthesis engine synchronized with speech output of phonemes, and wherein the mouth animation module is operable to play a frame of animation of a mouth of the character that corresponds to a current phoneme such that animation of the mouth is synchronized with the speech output.

13. The animation system of claim 10 wherein the animation server includes a parser for parsing speech input commands provided by the clients and passing parsed speech input commands to the speech recognition engine.

14. The animation system of claim 10 wherein the animation server includes a regionizer for scanning an animation frame and computing a non-rectangular bounding region for a non-transparent portion of the animation frame in real time as the sequence of constructed animation frames is played in the user interface on the display monitor; and wherein the animation system includes a region window controller for receiving the non-rectangular bounding region from the regionizer, for creating a region window on a display screen independent of any other window on the display screen and having a screen boundary in the user interface defined by the non-rectangular bounding region, and for clipping the constructed animation frame to the non-rectangular bounding region.

15. The animation system of claim 10 including a web browser for retrieving a web page from secondary storage of a local computer or from a remote computer, for parsing the web page to identify an embedded agent object tag, and for starting the server in response to detecting the embedded agent object tag; wherein the server is responsive to a first script command embedded in the web page to play a first sequence of frames of animation and lip synched speech output from the character on the user interface, and wherein the server is responsive to a second script command for receiving an identification of a speech input command and for sending notification to a local client representing the web script when the server detects the speech input command.

16. The system of claim 15 wherein the animation system includes a runtime compiler in communication with the web browser for compiling and executing a script program including the first and second script commands.

17. A method for generating an interactive, animated character in the user interface of a computer using a client-server architecture, the method comprising:

in response to a request from a client, creating an instance of a character and displaying the character in the user interface;

in the server, receiving from a client a set of client-specified user input commands that the character will respond to, the set comprising a speech input command;

in the server, monitoring for the specified user input commands;

in the server, sending a notification to the client when one of the user input commands is detected;

in the server, receiving from the client a request that is conditioned upon the notification from the server; and in response to the request from the client, playing back a client-specified sequence of animation and speech output to animate the character in the user interface.

18. The method of claim 17 wherein the client is a script embedded in a web page, wherein the script includes a first script command specifying text of the speech input command, wherein the server sends a notification to the client when the server detects that an end user has spoken the speech input command; and wherein the script includes a second script command requesting lip synched speech output from the server.

19. The method of claim 17 further including:

parsing a web page to identify an embedded script; and compiling the script to create the client.

20. The method of claim 19 further including:

in the server, processing requests to animate the character and play lip-synched output from the web script client.

21. A computer readable medium on which is stored software for performing the method of claim 17.

* * * * *

UNITED STATES PATENT AND TRADEMARK OFFICE
CERTIFICATE OF CORRECTION

PATENT NO. : 5,983,190

DATED : November 9, 1999

INVENTOR(S) :
Tandy W. Tower II, Mark Jeffrey Weinberg, and John Wickens Lamb Merrill It is certified that error appears in the above-identified patent and that said Letters Patent is hereby corrected as shown below:

Column 3, line 59, "28" should read --24--.
Column 3, line 60, "30" should read --26--.
Column 3, line 62, "24" should read --28--.
Column 3, line 63, "26" should read --30--.
Column 3, line 66, "24" should read --28--.
Column 3, line 67, "34" should read --33--.
Column 4, line 2, "38" should read --36--.
Column 4, line 3, "24" should read --28--.
Column 4, line 8, "26" should read --30--.
Column 4, line 9, "40" should read --38--.
Column 4, line 11, "42" should read --40--.
Column 4, line 17, "26" should read --30--.
Column 4, line 20, "28, 30" should read --24, 26--.
Column 4, line 22, "28" should read --24--.
Column 4, line 24, "30" should read --26--.
Column 4, lines 46-47, "ALU 34, registers 36" should read --ALU 33, registers 34--.
Column 4, line 47, "38" should read --36--.
Column 5, line 14, "time)." should read --time);--.
Column 6, line 20, "108" should read --110--.
Column 6, line 21, "110" should read --108--.
Column 14, line 51, "it's" should read --its--.
Column 20, line 16, "("GulID")" should read --("GUID")--.
Column 24, line 9, "uses" should read --use--.
Column 25, line 3, "event." should read --event--.
Column 25, Table Line 4, "a long" should read --A long--.
Column 25, Table Line 17, "an integer" should read --An integer--.

UNITED STATES PATENT AND TRADEMARK OFFICE
CERTIFICATE OF CORRECTION

PATENT NO. : 5,983,190

DATED : November 9, 1999

INVENTOR(S) :
 Tandy W. Tower II, Mark Jeffrey Weinberg, and John Wickens Lamb Merrill It is certified that error appears in the above-identified patent and that said Letters Patent is hereby corrected as shown below:

Column 27, lines 1-3, "The input and output object provide read only access to an The Input and Output Objectsagent's input properties and output properties." should read
--The Input and Output Objects
 The input and output objects provide read only access to an agent's input properties and output properties.--.
Column 28, line 46, "affect the how" should read --affect how--.
Column 35, line 45, "object$_{13}$Event" should read --object_Event--.
Column 36, line 36, "bounng" should read --having--.
Column 37, line 38, "acts a" should read --acts as a--.

Signed and Sealed this

Twenty-ninth Day of May, 2001

Attest:

NICHOLAS P. GODICI

Attesting Officer

Acting Director of the United States Patent and Trademark Office